(12) United States Patent
Ratti et al.

(10) Patent No.: US 12,249,152 B2
(45) Date of Patent: Mar. 11, 2025

(54) ARTIFICIAL INTELLIGENCE AND COMPUTER VISION POWERED DRIVING-PERFORMANCE ASSESSMENT

(71) Applicant: Jayant Ratti, Dubai (AE)

(72) Inventors: Jayant Ratti, Dubai (AE); Anubhav Rohatgi, Gurgaon (IN)

( * ) Notice: Subject to any disclaimer, the term of this patent is extended or adjusted under 35 U.S.C. 154(b) by 44 days.

(21) Appl. No.: 17/918,257

(22) PCT Filed: May 29, 2021

(86) PCT No.: PCT/IB2021/054731
§ 371 (c)(1),
(2) Date: Oct. 11, 2022

(87) PCT Pub. No.: WO2021/209981
PCT Pub. Date: Oct. 21, 2021

(65) Prior Publication Data
US 2023/0132646 A1 May 4, 2023

(30) Foreign Application Priority Data
Apr. 16, 2020 (IN) .............................. 202011016560

(51) Int. Cl.
*G06V 20/54* (2022.01)
*G06T 7/246* (2017.01)
(Continued)

(52) U.S. Cl.
CPC .............. *G06V 20/54* (2022.01); *G06T 7/248* (2017.01); *G06T 7/285* (2017.01); *G06T 7/74* (2017.01); *G06T 7/80* (2017.01); *G06V 10/776* (2022.01); *G06V 10/82* (2022.01); *G06V 20/40* (2022.01); *G06V 20/52* (2022.01); *G09B 19/14* (2013.01);
(Continued)

(58) Field of Classification Search
None
See application file for complete search history.

(56) References Cited

U.S. PATENT DOCUMENTS 11,348,269 B1 * 5/2022 Ebrahimi Afrouzi ........................ A47L 11/4025
2013/0150004 A1 * 6/2013 Rosen ............... H04M 3/42357 455/418

(Continued)

FOREIGN PATENT DOCUMENTS

WO 2020042489 A1 3/2020

*Primary Examiner* — John W Miller
*Assistant Examiner* — Sean N. Haiem

(57) ABSTRACT

Present invention provides a system and method that includes installation of one or more cameras at various locations on a smart driving yard or in a parking lot. These cameras capture activity of a vehicle in the smart driving yard and perform an analysis using Computer Vision and machine learning. In some embodiments, one or more drones may also be employed for capturing the vehicle activity. The vehicle location is identified based on the individual pose of markers installed on the vehicle for easier object localization. The vehicle is then localized and its location is marked on a 2-dimensional map of the yard. Subsequently, a lane model is applied to identify driving violations or errors that a driver commits while driving. Subsequently, a lane model based on decision trees algorithm is trained to identify if the vehicle touches/intersects any of the parking line markings or any zones of interest.

18 Claims, 19 Drawing Sheets

(51) Int. Cl.
    *G06T 7/285*     (2017.01)
    *G06T 7/73*     (2017.01)
    *G06T 7/80*     (2017.01)
    *G06V 10/776*     (2022.01)
    *G06V 10/82*     (2022.01)
    *G06V 20/40*     (2022.01)
    *G06V 20/52*     (2022.01)
    *G09B 19/14*     (2006.01)
    *G09B 19/16*     (2006.01)
    *H04N 7/18*     (2006.01)

(52) U.S. Cl.
    CPC ............ *G09B 19/167* (2013.01); *H04N 7/181* (2013.01); *G06T 2207/10032* (2013.01); *G06T 2207/20084* (2013.01); *G06T 2207/30204* (2013.01); *G06T 2207/30232* (2013.01); *G06V 2201/08* (2022.01)

(56) References Cited

U.S. PATENT DOCUMENTS

| | | | | |
|---|---|---|---|---|
| 2014/0257943 | A1* | 9/2014 | Nerayoff | G06T 7/292 |
| | | | | 382/104 |
| 2015/0310624 | A1* | 10/2015 | Bulan | G06V 20/54 |
| | | | | 382/103 |
| 2018/0204111 | A1* | 7/2018 | Zadeh | G06V 10/764 |
| 2018/0211117 | A1* | 7/2018 | Ratti | G06V 10/764 |
| 2019/0354775 | A1* | 11/2019 | Leizerovich | G08B 25/016 |
| 2020/0327343 | A1* | 10/2020 | Lund | H04W 4/46 |

* cited by examiner

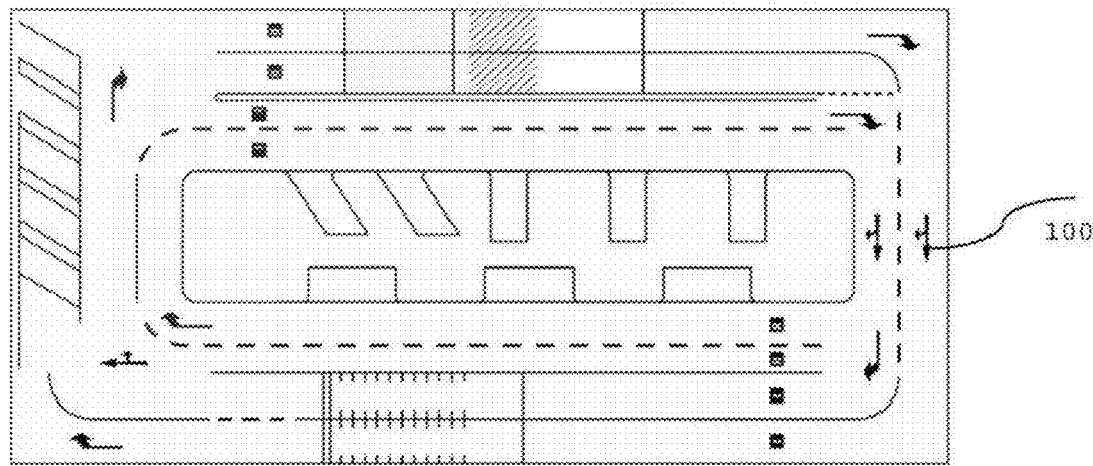
FIG. 1
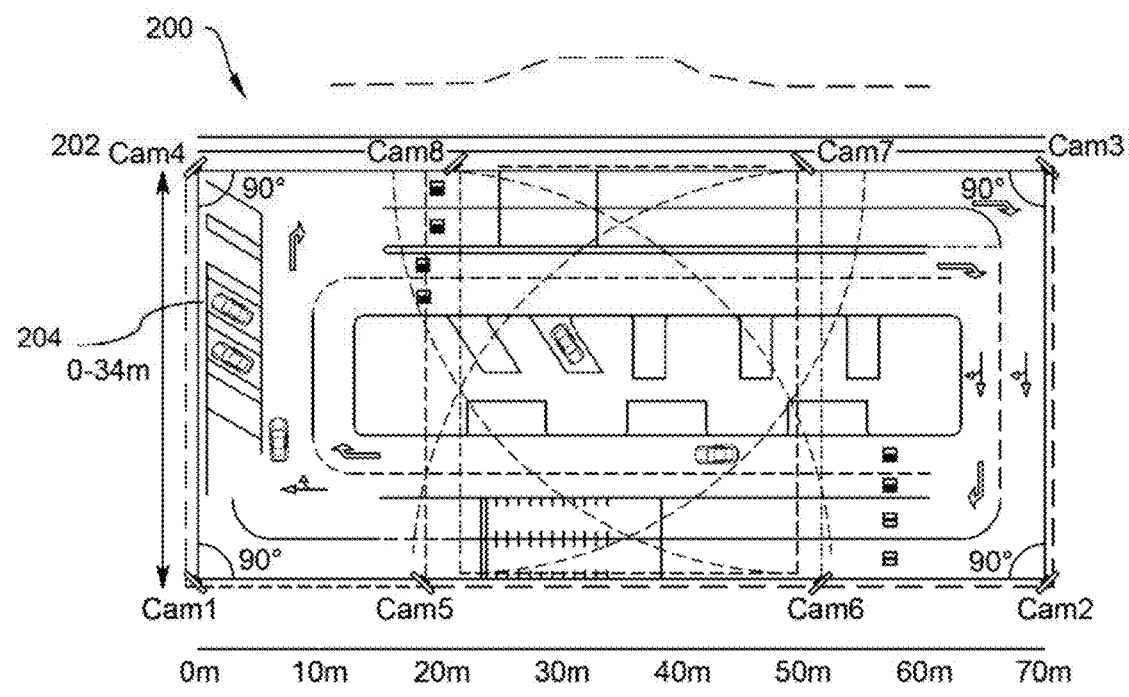
FIG. 2a
FOV

Camera Coordinates

ARTIFICIAL INTELLIGENCE AND COMPUTER VISION POWERED DRIVING-PERFORMANCE ASSESSMENT

CROSS-REFERENCE TO RELATED APPLICATION

The present application claims the priority benefit of Indian provisional patent application number 202011016560 for a method and system for smart driving assessment, filed on Apr. 16, 2020, which is hereby incorporated by reference in its entirety.

FIELD OF THE INVENTION

The present disclosure relates to a driving assessment and more specifically related to an assessment system and method implemented in a driving yard to monitor a driver autonomously in order to assess driving performance.

BACKGROUND

According to certain conventional technologies, driver training assessment includes manually assessing skills of drivers by instructors. In this method, the driving violations committed by the driver are manually identified by the instructor and consequently, a report is generated on the driving performance of the driver. This technique is time consuming and vulnerable to human errors since it requires a substantial manual effort. An additional challenge with the conventional driver assessment is that one instructor can only manage one driver, thereby, limiting the throughput.

According to some other conventional technologies, in order to assess the driving performance, authorities may install several markers at various positions in a driving yard. A camera in a vehicle being driven in the driving yard scans these markers and assists a server in the driving yard to calculate the position of the vehicle to determine driving performance. A challenge associated with this implementation is that substantial infrastructural changes need to be made to install the markers in the driving yard. Additionally, even if one of these markers is damaged, it may lead to incorrect performance assessment of the driver.

Therefore, there is a need to address the above-mentioned challenges and to reduce the human effort while also ensuring minimal cost and increased throughput.

SUMMARY

The present invention provides a system and method that includes installation of one or more cameras at various locations in a smart driving yard. The one or more cameras are installed on one or more poles or high-altitude structures. These cameras capture the driving activity of one or more vehicle, happening anywhere in the smart driving yard and perform a performance analysis using Computer Vision (CV) and machine learning (ML). The vehicle location is identified based on the individual pose of markers that are installed on the vehicle for easier object localization. In some embodiments, the vehicle location is estimated by using various triangulation techniques with the assistance of multiple cameras located in the smart driving yard. The vehicle is then localized and its location is marked on a 2-dimensional map of the yard drawn to scale. This enables assessment of real-world dynamics of the vehicle such as but not limited to speed, bearing and position in the yard. Subsequently, a lane model is applied to driving dynamics such as, but not limited to speed, bearing and position of the vehicle, to identify driving violations or errors that a driver commits while driving.

In some embodiments, an artificial intelligence (AI) based computer vision (CV) system for pose and position estimation for Vehicles moving or parked in a driving yard and/or parking lot, comprising a network of cameras to capture a series of images or videos of one or more vehicles with one or more installed markers and configured to move in a predefined area, a memory having embodied therein one or more routines operable to detect the one or more vehicles in the series of images or videos using Artificial Neural Networks; and one or more processors coupled to the memory and operable to execute the one or more routines to detect a pose of each of the one or more markers from the series of images or videos; determine one or more parameters related to a movement of the one or more vehicles in the predefined area based on detection of the pose of the one or more markers and automatically detect one or more driving violations committed by the one or more vehicles based on the determined one or more parameters.

In some embodiments, the processors in the system are configured to share the series of images or videos with a network of specialist and workers to validate Computer Vision based system-generated judgements of the driving violations or regions of interest or Events of interest associated with the one or more vehicles.

In some embodiments, a driving violation detection system is disclosed. The system includes a movable object having one or more installed markers and configured to move in a predefined area. The system further comprises one or more cameras configured to capture one or more visuals of the one or more markers installed on the movable object; and a processor, which is configured to detect a pose of each of the one or more markers from the captured one or more visuals. The processor is further configured to determine one or more parameters related to a movement of the movable object in the predefined area based on detection of the pose of the one or more markers and subsequently, automatically detect one or more driving violations committed by the movable object based on the determined one or more parameters.

In some embodiments, one or more drones may fly over the smart driving yard and capture the vehicle activity. The drones may be used as a replacement of or in conjunction with one or more cameras installed at various locations in the driving yard. In an exemplary scenario, two or more drones may fly over the driving yard, where one drone may be used at a time to capture the vehicle activity and another may get charged.

In yet some other embodiments, the driving violations may be detected by using Artificial Intelligence (AI) and/or Machine-Learning (ML) algorithms. In the embodiments where AI and/or ML algorithms are used, the use of markers to localize the car is not necessary. Instead, a 'you only look once' (YOLO) V3 model may be used in order to detect and track the vehicle in the camera view. With the assistance of this mode, not only the localization of the vehicle, but wheels and other visible parts of the car as well may be captured. With this information along with the dimensions of the car, the pose of the car may be estimated and marked on a 2-dimensional yard map (minimap). This avoids the use of marker and additional geometrical calculations for detecting markers and their pose. Further, for lane model to detect traffic violations, UNET, which is a type of convolutional neural network architecture, is used as a semantic segmentation network. This isolates the lanes from the rest of the map and advantageously, reduces a lot of manual work of updating lane models when the yard's geography changes. In some embodiments, however, Long Short Term Memory Network (LSTMS) are also used to predict and model driving behaviors and test performance.

In some other embodiments, an Occlusion Classifier is used to detect driving violations. In some of these embodiments, a lane model based on a decision trees algorithm is trained to identify if the vehicle touches/intersects any of the parking line markings or any zones of interest. As a part of reinforcing the violation model inferences, a binary classifier is trained on occluded or not occluded line marking which enforces double check on violation triggers. Further, the Occlusion Classifier is trained on mobilenet neural network architecture to identify if a region of interest (ROI) is occluded or not. The objective here is to draw the required ROIs around parking boundaries in the driving yard and slice these rectangular or non-rectangular ROIs into squares and then pass these squares through a binary classifier to determine if the area enclosed within the box is obstructed by either the vehicle or any part of the vehicle. If the area is obstructed by the vehicle, an alarm is raised.

In some embodiments, while drawing anything on the image, when a human taps on the image, then a zoomed view of that tapped location is shown at top left corner to show what is underneath the finger.

The present disclosure further relates to artificial intelligence (AI) and neural networks.

An aspect of the present disclosure relates to artificial intelligence (AI). In particular, the present disclosure pertains to artificial intelligence based system and method for avoidance of traffic violations.

In an aspect of the present disclosure relates to a scalable network system configured with one or more artificial intelligence (AI) algorithms and/or machine learning (ML) algorithms. The system includes one or more processors coupled to a storage device and operable to execute these one or more modules. The one or more routines includes an collecting module, which when executed by the one or more processors, collect, based on the one or more AI and/or ML algorithms, at least a combination of objects and/or events of interest from the one or more cameras as explained above, wherein said combination of objects or events of interest comprises at least an image having one or more identifiable objects, and a transmit module, which when executed by the one or more processors, transits the obtained combination of objects or the obtained events of interest to the one or more servers.

In an aspect, the one or more AI algorithms and/or ML algorithms are configured to train automatically and upgrade based on said combination of objects or events of interest.

In an aspect, the one or more servers are configured to perform a series of AI based inference on the obtained combination of objects or the obtained events of interest, and categorize into data points.

Thus, the entire driver assessment process becomes automated, thereby, making the driver assessment process convenient and prompt. The present invention enables a driver to merely complete the assessment as the other technicalities are now managed by the system itself. Additionally, the present invention enables multiple drivers to be autonomously managed by the system, thereby, increasing the throughput. Moreover, there is no requirement for markers to be placed in the driving yard and thus, the current invention reduces the cost of implementation as well.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein:

FIG. 1 illustrates a top-view of a driving yard in accordance with conventional technologies.

FIG. 2a illustrates a smart driving yard or a parking lot equipped with cameras installed at various positions and FIG. 2b illustrates an exemplary drone to capture vehicle activity in the smart driving yard, according to the embodiments of this invention.

DETAILED DESCRIPTION

Figure 2B:
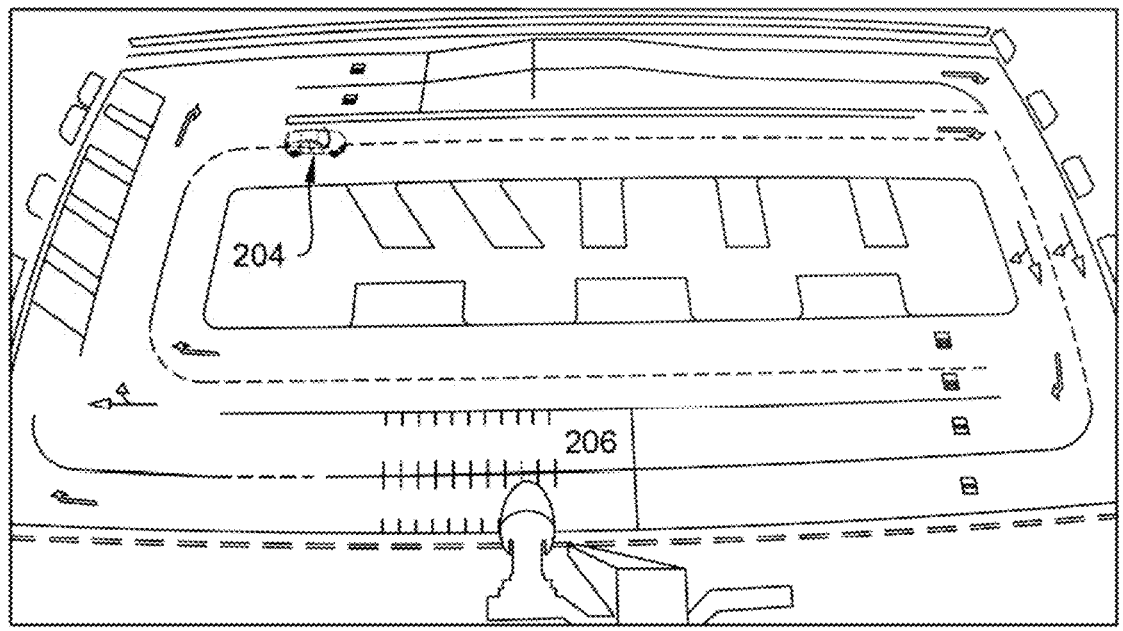
Figure 2C:
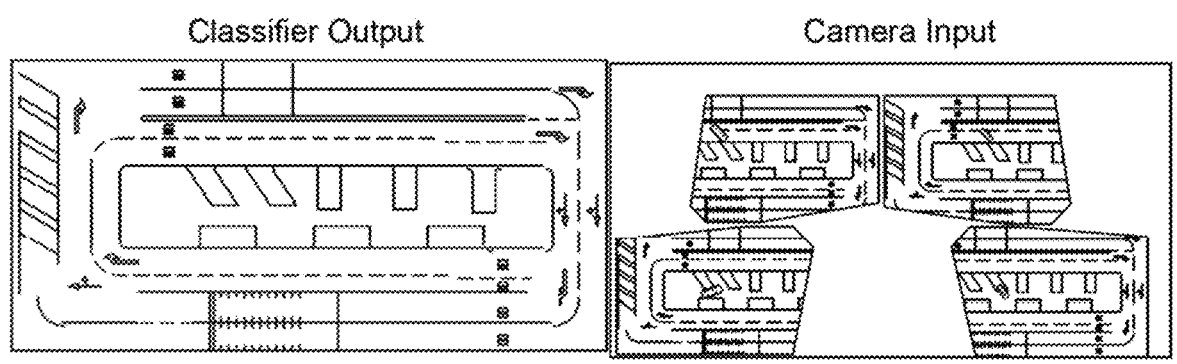
FIG. 2c illustrate a computer simulation of the smart driving yard, in accordance with the embodiments of this invention.
Figure 2D:
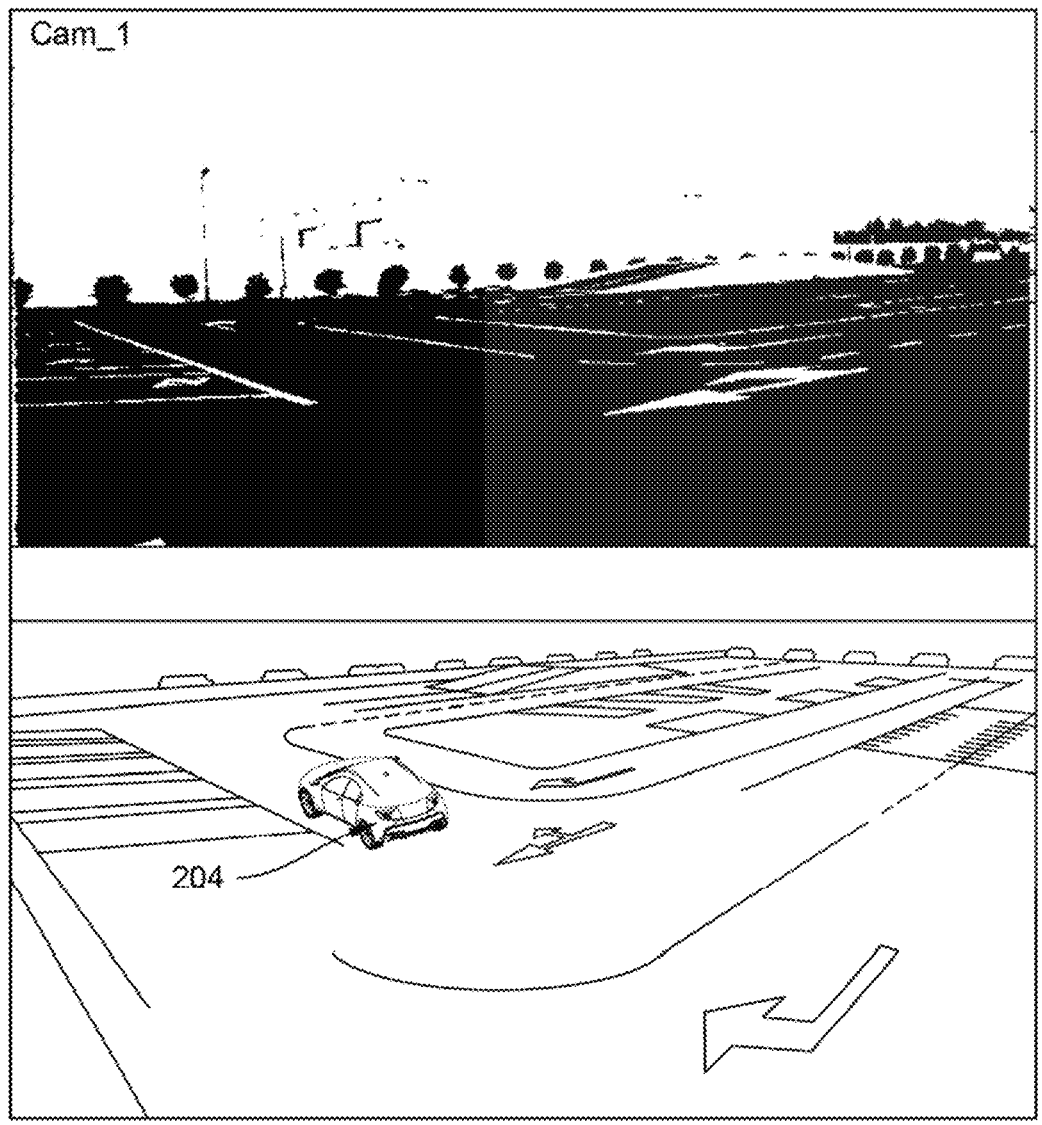
FIGS. 2d to 2k illustrate computer simulation views of a smart driving yard from various cameras located in the yard, in accordance with the embodiments of this invention.
Figure 2E:
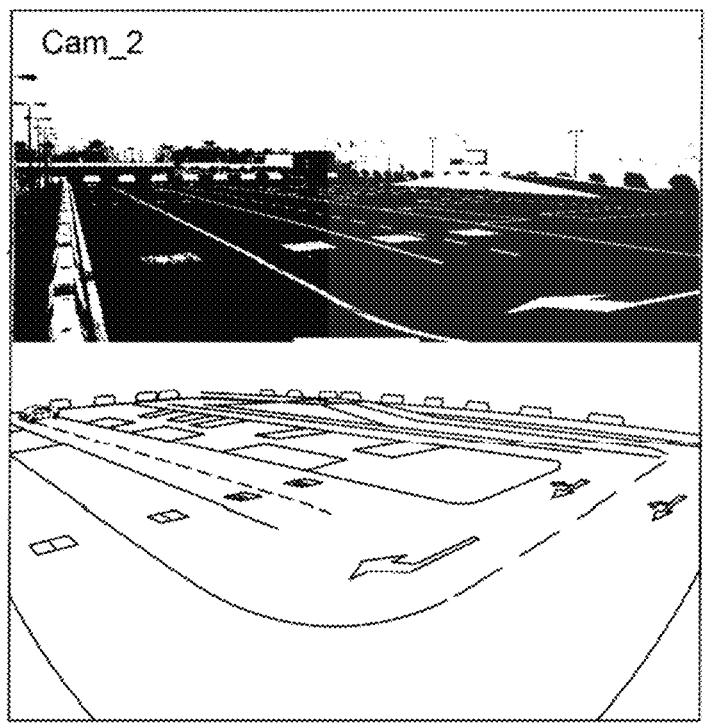
Figure 2F:
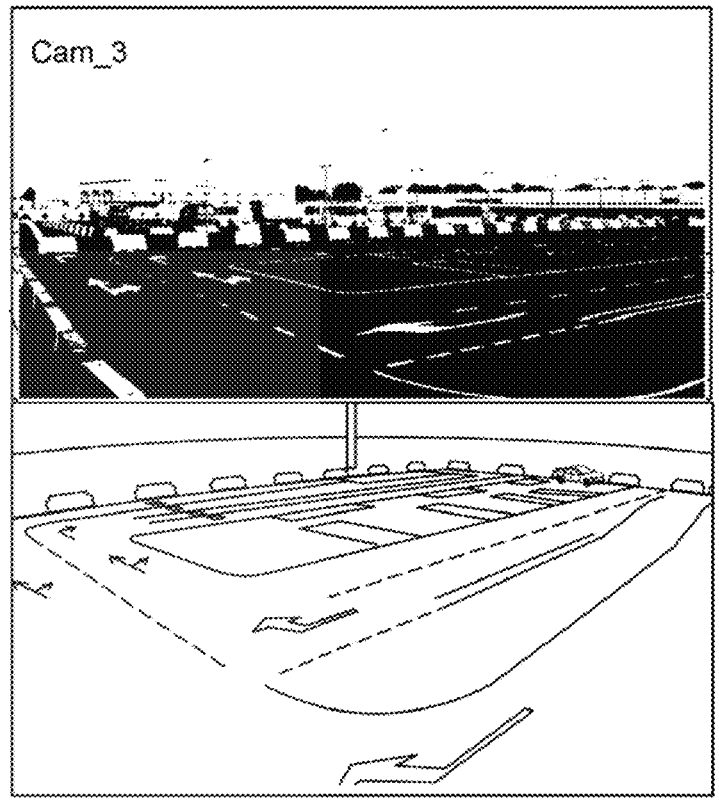
Figure 2G:
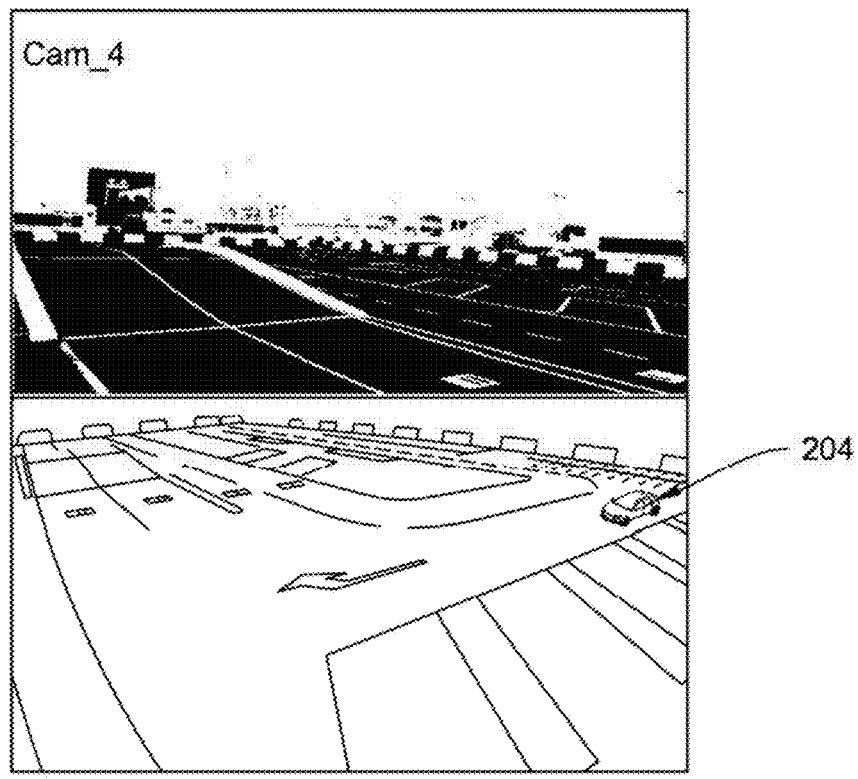
Figure 2H:
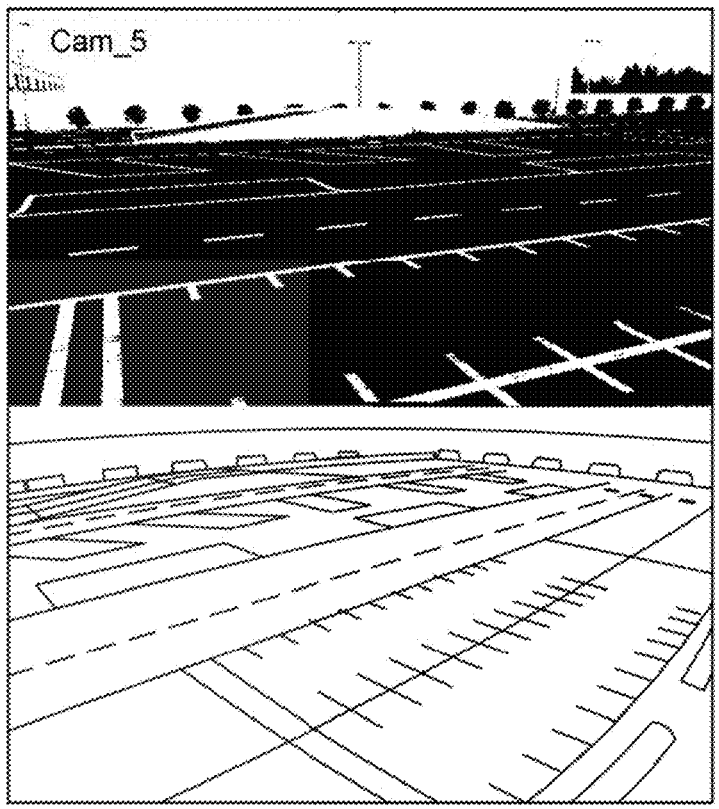
Figure 2I:
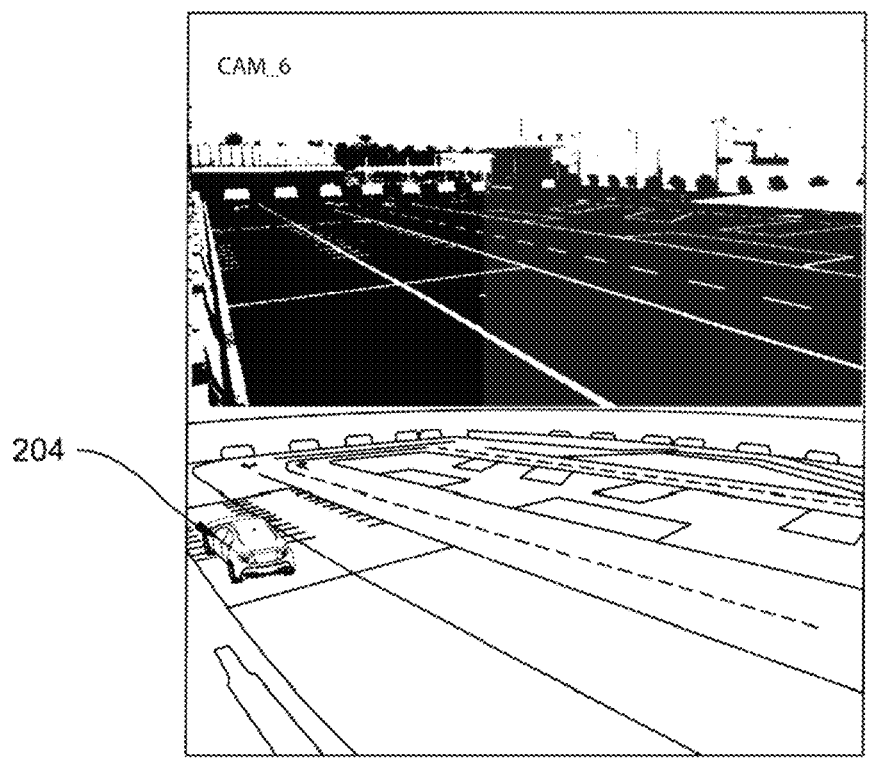
Figure 2J:
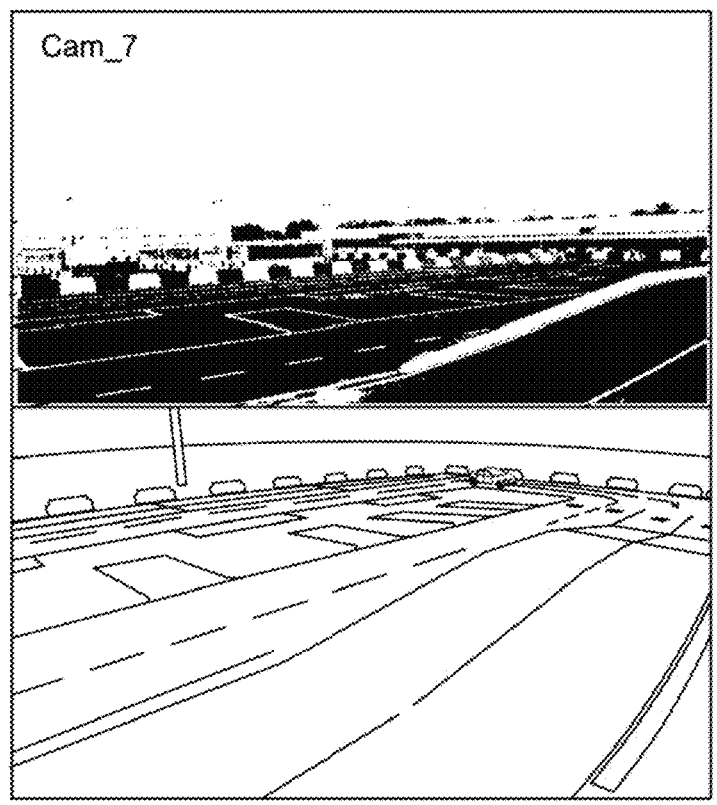
Figure 2K:
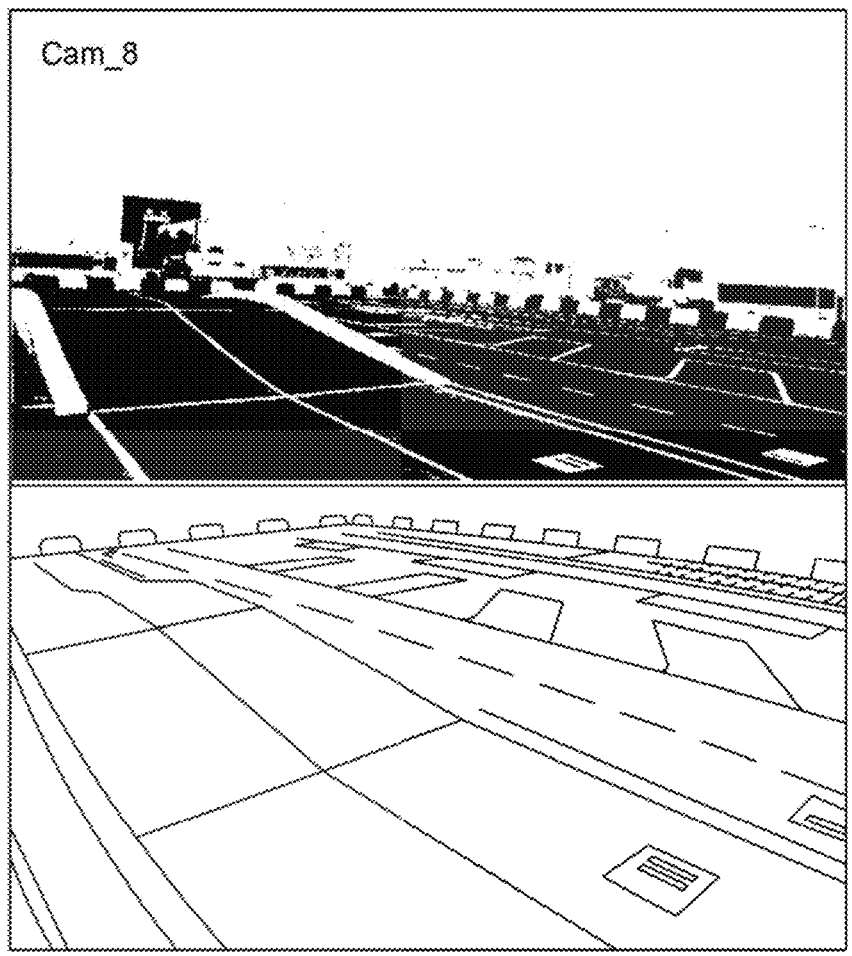

In order to describe features of the disclosure, a more detailed description of the presently described technology will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings.

FIG. 1 illustrates a top-view of a driving yard 100 in accordance with conventional technologies. In some embodiments, such a driving yard 100 may be operated by a third-party such, but not limited to, an administrative authority or a private company. Such a driving yard may be used to assess the driving skills of drivers. Generally, a driver undergoes a drive-test by driving a vehicle in the yard for a certain time duration to perform a certain number of predefined driving activities. For example, the driver may perform activities such as, but not limited to, forward and reverse movement of the car, emergency braking, movement on a ramp, parking at a designated spot and so on. An instructor, who needs to accompany the driver during the above drive-test, manually assesses the driving skills and identifies the driving violations committed by the driver. Subsequently, a report is generated by the instructor or based on the inputs received from the instructor, that identifies the violations committed by the driver.

FIG. 2a illustrates a smart driving yard 200, according to the embodiments of this invention. Such a smart driving yard may be drawn to scale and may employ one or more cameras 202 to capture the plurality of visuals of the vehicle 204. Such visuals may include images or video feed of the vehicle 204 in real-time or non-real-time. In accordance with the embodiments of this invention, the cameras may be installed at various locations of the yard and are illustrated by 'Cam 1, Cam 2, Cam 3 . . . and Cam 8 in FIG. 2a for exemplary purposes. For example, multiple cameras 202 are installed around the perimeter of the yard as illustrated in FIG. 2a to ensure that the entire yard is in the field view of the cameras. A person skilled in the art would appreciate the number of cameras discussed above is merely for exemplary purposes and this number may vary based on the design requirements. Additionally, the cameras need not be necessarily installed along the perimeter of the yard but may also be installed at any desirable position in the yard.

The addition of the number of cameras can increase the area of coverage of the network and also the accuracy of the pose and position estimation.

In some embodiments, incoming frames from either some or all of the above-mentioned cameras are synchronized with each other. In accordance with these embodiments, a processor in the system may run separate processing threads corresponding to incoming streams from each camera. In an exemplary scenario, assuming that one of the cameras is sending frames to a server in the smart yard at a slower rate compared to that another camera, a synchronizer thread identifies the slower camera frame grabber thread based on a first faster frame received at the grabber thread end with respect to the second slower camera and the time difference between the first and second frames received from the slower camera.

Further, once the synchronizer thread identifies the slower camera, it terminates itself after providing frame keys to the processing thread. Processing thread is a thread that is independent of the other grabber threads. It is started as soon as the algorithm is initiated but waits until it receives the frame synchronization key. Once the key is received, the thread starts processing on the set of frames from all the cameras received over the frame buffer. Keys assist in identifying from which index in the frame buffer is the slowest camera frame and corresponding frames from other cameras. Any process such as an image processing or an Artificial Intelligence (AI) process can be attached to this thread.

The grabber threads run independently and store the respective frames from each camera in respective frame buffers. The frames are currently stored along with frame identifiers, but it is also possible to use image hashing to maintain uniqueness with referenceability between the received frames from respective cameras.

The grabber threads run independently and stream continuously to the viewer thread. Viewer thread is a thread that is used for only viewing the synchronized frames attached together to form quadrants or multi-picture or picture in picture (PiP) views in a single window. This can be further used to extend to non-blocking UI. There can be multiple viewers and processing threads. Processing thread is a thread that is independent of the other frame grabber or synchronizer threads. It is started as soon as the program is fired but waits until it receives the first frame synchronization key.

One way of working with a Processing Thread: Once the key is received, the thread starts processing on the set of frames from all the cameras received over the frame buffer. Keys help identify from which index in the frame Buffer we have the slowest camera frame and corresponding frames from other cameras also. We can attach any process to this thread. A process can be image processing or an AI process also.

Another way of working with a Processing Thread: The above-described approach is used with the exception that instead of saving the frames or adding the frames to a frame buffer, the processing thread waits for the synchronization to happen first and then it queries the respective cameras for accessing the frames. Hence, the server processes the query when required, and not all the time. This may induce frame drops, but this technique maintains synchronization and low storage complexity. Additionally, the query is only made by the processing/viewing thread. Thus, once the viewing thread completes iterations over the frame it is processing, it queries the available cameras for the next set of frames, which is done synchronously at the same time.

Another objective of the invention is to provide a mechanism for a semi-automated calibration technique. For example, if a position of a camera is changed because any external event such wind, dust-storm, rain and so on, it may need to be auto-calibrated. In these embodiments, initial camera views are captured and selected key points from the 2D layout of the ground are parked as ground truth for future references. The points are selected and hand marked so that they fall on the corners of defined parking zones and lanes marked on the ground and are easily identifiable in the camera views. These points form the point pair correspondences between the camera view and the 2D Layout.

With the existing pair of correspondences, a homography is calculated between the pairs of camera view and 2D layout map of the yard. Thus, we achieve a set of initial point pairs and corresponding homographies. We label them as ground truth. Subsequently, we detect using feature detection method such as but not limited to Harris corners on the previous and current camera frames, especially taking into account more stable and strong edges. This is repeated for individual cameras.

Further, we track these points in the real system, if the camera shakes or is displaced under a set threshold, the displacement between the ground truth frame and the current frame is calculated using image processing algorithms such as but not limited to Lucas Kanade Sparse Optical Flow algorithm. The displacement of individual key points is calculated using the Euclidean equation and is then averaged out to calculate the global motion analysis of the keypoints manually or automatically. If this global displacement average is above a set threshold then we say the cameras require re-marking of the ground truth points as the scene is changed drastically. Below this threshold the displacement is added to the individual ground truth points that were marked on the respective camera views and the homography between this new set and the 2D layout map is recalculated and thus, we achieve recalibration of the camera views.

In an alternate embodiment as illustrated in FIG. 2b, one or more high-altitude cameras or drones 206 may be used to visually monitor the smart driving yard and to capture the activity of the vehicle being driven in the smart driving yard. In an exemplary scenario, two or more drones may be used wherein, one drone monitors the yard and the others get charged. In an exemplary scenario, the high-altitude camera or drone may be placed at a height of 100 feet from the yard level. Since the drone already provides the desired view, a bird's eye view may no longer be required. The advantage of using drones to capture the vehicle activity is easier and faster as compared to those of the conventionally installed cameras. Further, after each assessment, time required to start the process again will be less as camera view would not get disturbed. This setup may not require Yard Segmentation unlike the previous setup with conventional cameras.

In some embodiments where static cameras are used, the cameras may be installed at a predetermined height from the ground level or may be located at the ground level depending on the design requirements. In some embodiments, since a single camera may not cover the entire field view of the yard, multiple cameras may need to be installed to capture the entire area of the yard. In an exemplary embodiment, the cameras may be CCTV cameras that are used for video surveillance.

To illustrate an exemplary scenario, FIGS. 2d to 2k illustrate computer simulation views of the smart driving yard from various cameras Cam 1, Cam 2, Cam 3, . . . . Cam 8 located in the yard, in accordance with the embodiments of this invention.

Further, a vehicle such as, but not limited to, a car is illustrated in FIG. 2 at various positions on the smart driving yard. The vehicle is moving throughout the area of the smart driving yard for the purposes of this invention. The movement of the vehicle is for the purposes of conducting a drive-test in order to assess the performance of the driver of the vehicle.

In some embodiments, the one or more of the above-mentioned cameras may need calibration and/or re-calibration. This is one of the most important steps since homography calculated from this would be further used for plotting the vehicle movement on a 2d-map. In these embodiments, since the cameras are placed in a real-world environment, their field-of-view (FOV) is prone to displacement because of external factors such as wind, rain, thunderstorm or bird-hits. The present invention also provides a calibration and/or re-calibration technique to address this problem.

Figure 2L:
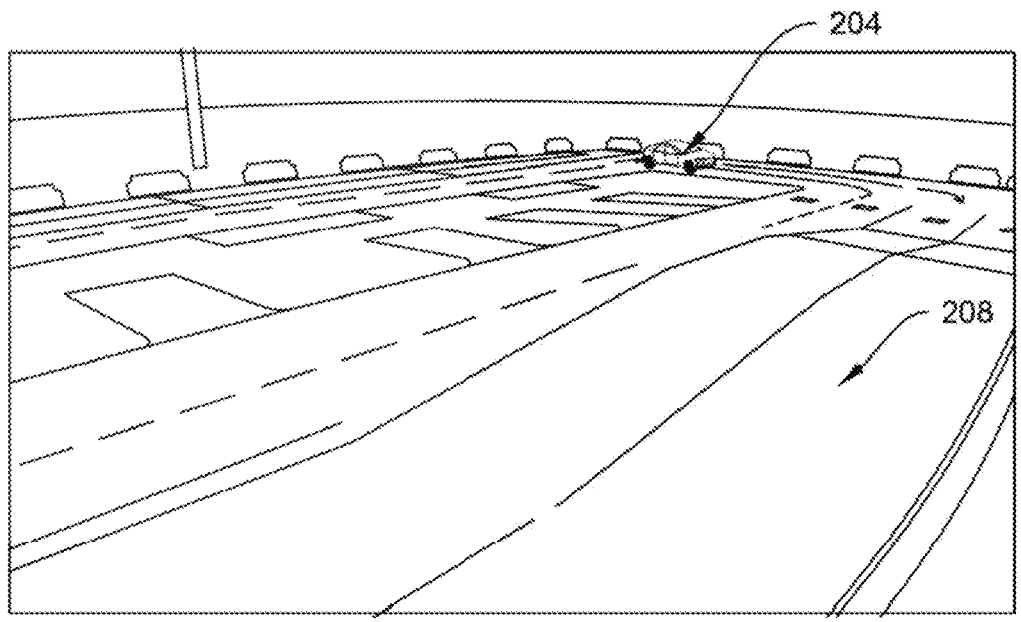
FIGS. 2l to 2o illustrate a calibration and recalibration technique implemented in the smart driving yard, in accordance with the embodiments of this invention.
Figure 2M:
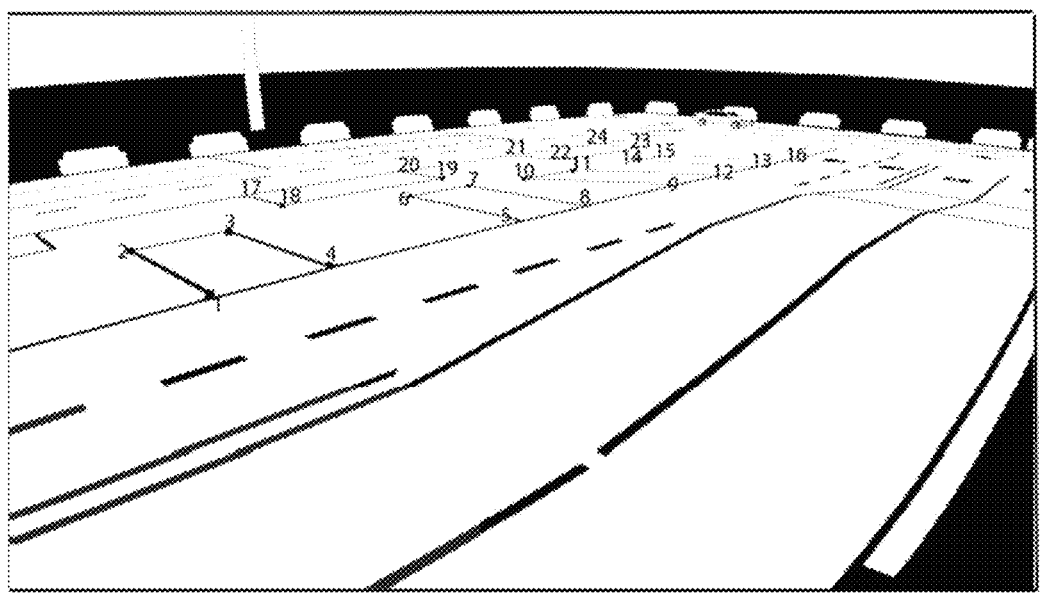
Figure 2N:
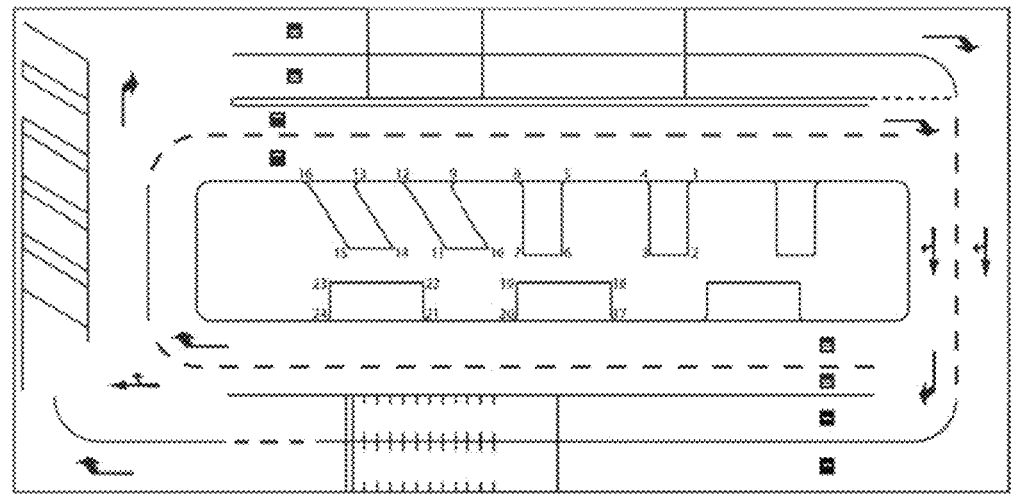
Figure 2O:
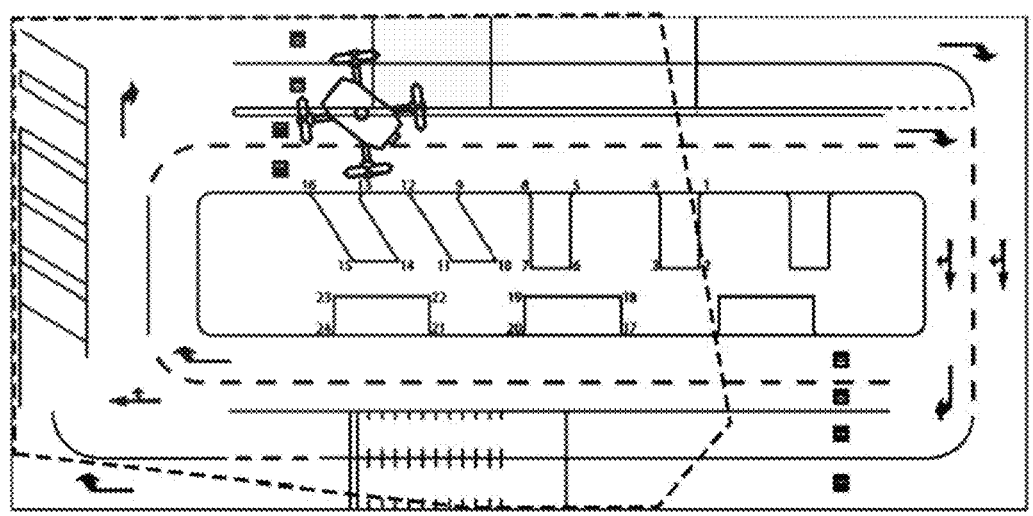

FIG. 2l illustrates the camera view of Cam 1 and FIG. 2m illustrates its corresponding 2d-map of the driving yard. Only those points on the camera view should be marked which are clearly traceable on the 2d-map. For Example, the points taken in FIG. 2n represent the corner-points 1-23 of the parking zones on the driving yard, which are clearly traceable on the 2d-map as illustrated in FIG. 20. Also, the points on the ramp 208 should be avoided to be taken into consideration as the ramp is on a different plane and not being considered for calculation of homography. More the number of points marked, more accurate would be the homography.

At the same time, a person skilled in the art should be careful as mentioned in the above step and points chosen should be easily traceable on 2d-map. All points marked on camera view should be in correspondence with points marked on 2d-map. Discrepancy of a single point could also lead to miscalculation of homography because homography is always calculated in pairs. For instance, FIG. 20 illustrates the camera view superimposed over the 2d-map as per the technique discussed above. Verification happens when the camera view is superimposed on the yard map using the homography matrix calculated as described later in this disclosure. In this figure, it is illustrated that features of the camera view do not fall on the positions as described in the yard map.

Figure 3:
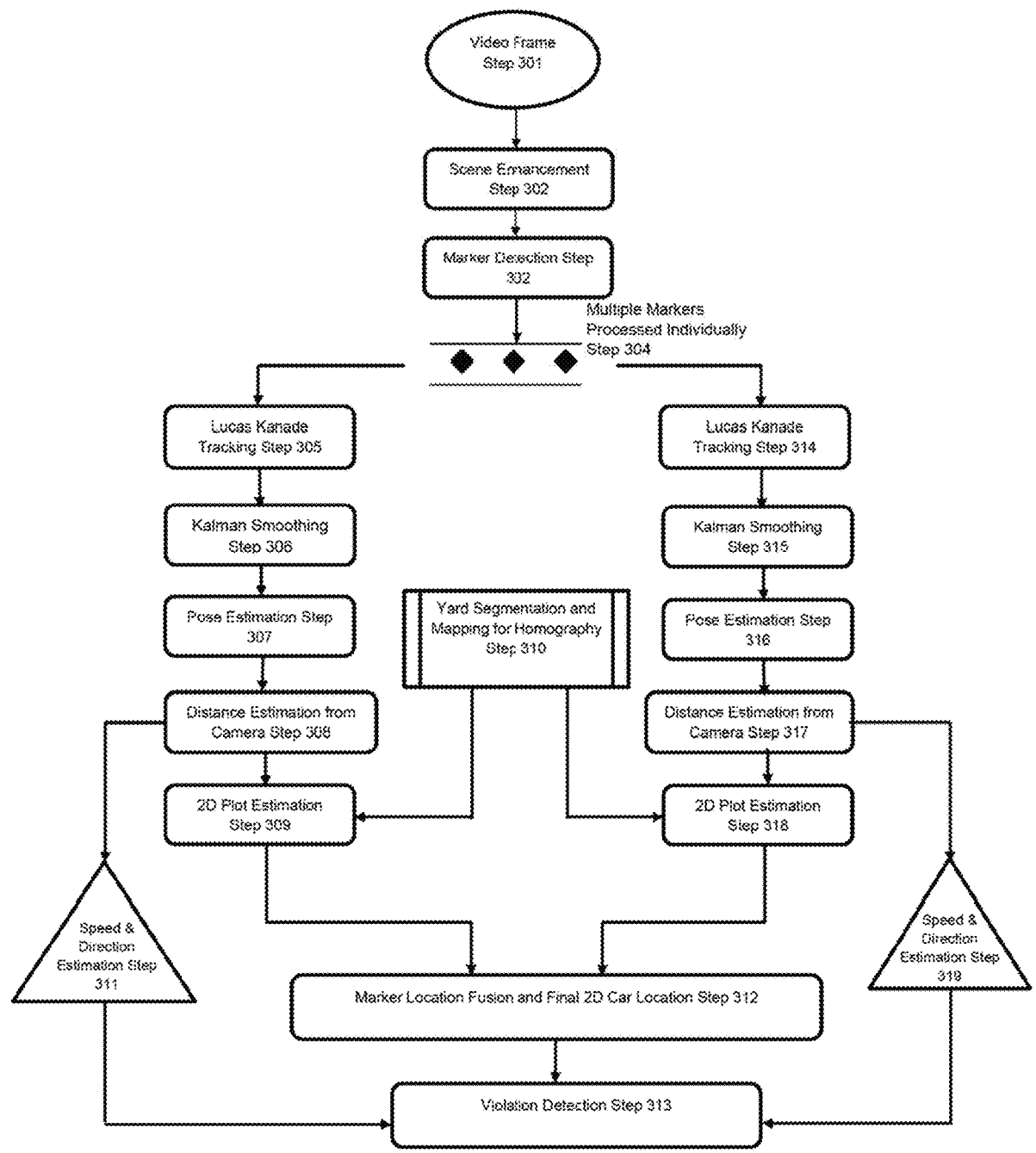
FIG. 3 illustrates a flow chart for smart driving assessment in the smart driving yard, according to the embodiments of this invention.

FIG. 3 illustrates a flow chart for smart driving assessment, according to the embodiments of this invention. Once the driver starts driving the vehicle, one or more cameras in the smart driving yard are activated and initiate capturing visuals such as but limited to, an image or video feed of the driver and the vehicle in step 301. In step 302, the video feed is provided in real-time to a server associated with the yard. The server applies scene enhancement algorithms on the video feed to enhance the quality of frames captured in the video feed. Scene enhancement implies contrast adjusting, removing noise and highlighting lanes that the image/camera captures. The following scene enhancement algorithms are used:

1. CLAHE—Contrast Limited adaptive histogram equalization.
2. Conversion from RGB/BGR color space to HLS color space and then segmenting of the white and yellow shaded regions.
3. Subsequently, these regions are passed to a deep learning edge detection model-called as Structured Edge Detection—DexiNed, which provides all the edges pertaining to the required and some non-required regions.
4. Subsequently, the linear components are post processed and regressed to identify lane markings and other related components like parking lots, Emergency braking regions and other geometrical shapes available on the yard, which assists in identifying homography between the camera view and the 2D map.

Figure 4:
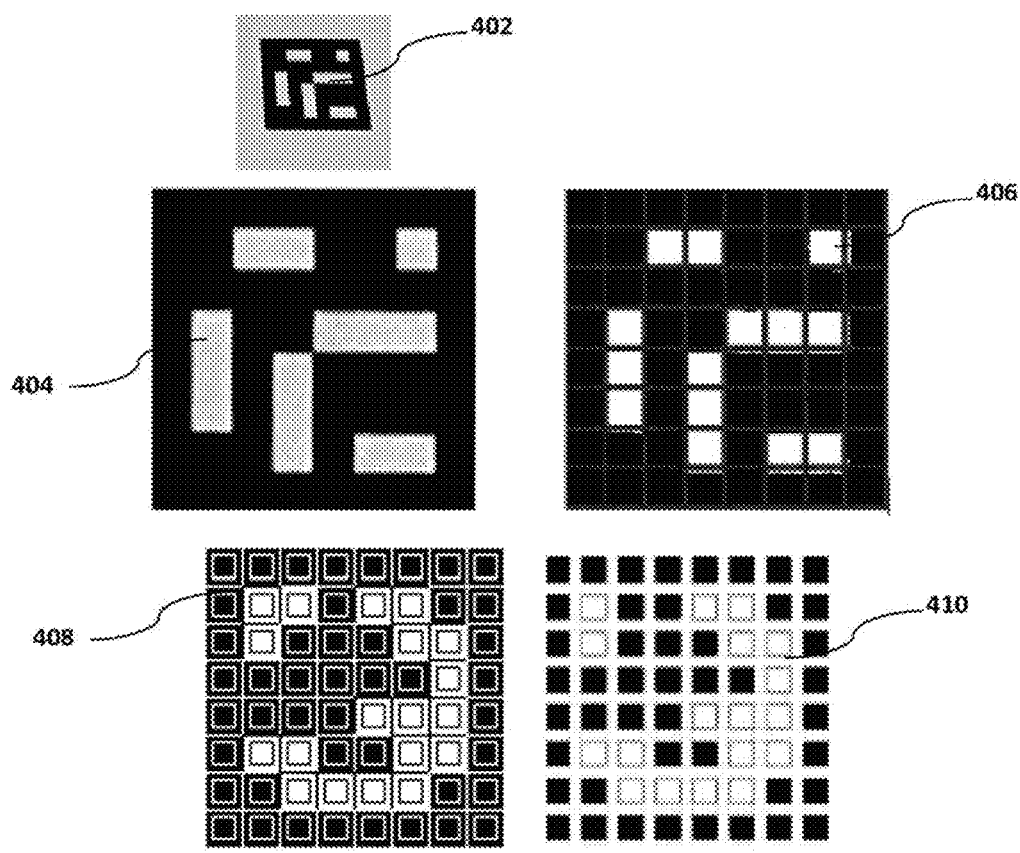
FIG. 4 illustrates an example of vehicle markers that may be used for smart driving assessment, according to embodiments of this invention.

In step 303, the server detects one or more markers installed on the vehicle, from the received video feed. In some embodiments, Aruco markers are selected to represent different sides on the car. Fiducial markers make object detection and pose estimation convenient. This reduces the task of car detection using single shot detector (SSD) models for marker detection. The programming task of marker detection is also reduced as Aruco marker detection is already included as a contrib module in OpenCV. Some exemplary markers 402, 404, 406, 408 and 410 are illustrated in FIG. 4 for representative purpose. In some embodiments, two markers may be installed or pasted on one side of the vehicle. In an exemplary scenario, markers are installed on both sides of a car along the length. The distance from the center of the marker to the bottom of the car (ground plane) is measured and fed into the system. For real distance measurements, the actual dimensions of the marker also need to be provided. In the current scope, the markers are square of can vary in the range of 50-70 cm. All the markers need to be of same size and shape. Marker detection, as discussed above, identifies the coordinates of the corners of the marker which can then be made useful in pose estimation of each marker on the car individually with respect to the cameras. In some embodiments, Aruco Markers may be replaced with a stable fiducial marker system (STag) which seems to be more stable and visible from longer distances. In some other embodiments, deep-learning based marker detection may also be implemented. Deep Learning based marker detection is based on the already available YOLOv3, mobileNet neural networks. The rationale is to train certain markers, in this case marker need not be a square shape, it can be any shape which is asymmetric, ultimately resulting in good pose estimation.

In step 304, the server may, in some embodiments, detect multiple markers, individually. In some embodiments, each vehicle may have 4 different markers located on various positions on the vehicle-top, front and both sides of the vehicle. In some other embodiments, a vehicle may have 2 markers installed on one side of the car and they may be sufficient to detect a pose of the vehicle. Further, visual odometry is an essential aspect of the present invention as it enables the system to identify markers position and orientation and is preceded by tracking of object points to generate a motion model of the car. Further, the detection of markers is an essential step for detecting various parameters associated with the movement of the vehicle. For instance, if a pose of the markers can be correctly detected by the server, it may be used to subsequently detect various parameters such as, but not limited to, a geographical location of the vehicle, a pose of the vehicle, a speed of the vehicle, a velocity of the vehicle, a direction of movement of the vehicle and an orientation of the vehicle.

In the present approach for marker detection, marker corners are tracked by the Kanade Lucas Tomasi (KLT) methods, as illustrated in step 305 of FIG. 3. Further, in step 306, the motion model is imposed to the Kalman filter to predict and estimate the best tracked path of KLT tracking results. KLT algorithm's objective is to find the best alignment of the marker template with the warped image by minimizing the sum of squared error between them. KLT uses spatial intensity information to direct the search for the position that yields the best match. The objective is to yield position (x,y) by searching the best match of the template (true copy of marker) with the one appearing on car (added distortion). This algorithm finds the best alignment for each possible location in the search space which contains several regions around the previous state.

In the case of variations in appearance of the vehicle such as illumination, pose object changes and similarity in appearance, KLT may drift to a wrong region of cluttered background. One of the solutions for this problem is to use an estimator which can predict the target's next position based on its current position. For solving the problem of the KLT method, the kalman filter may be acquired as a predictor of the next object's position. In this case, Kalman filter can impose the motion model of the car as the process noise covariance. In current task, it is an iterative process that uses a set of equations and consecutive data inputs to quickly estimate the true value, position, velocity, acceleration of the object being measured. The state vector is:

$X=(x,y,dx,dy,dx^2,dy^2)$

There are basically 3 steps involved which take place iteratively in the above process:
  a. Calculation of Kalman Gain: This is obtained by error of the previous estimate and error in data (measurement).

$KG=E_{EST}/(E_{EST}-E_{MEA})$ b. Calculation of Current Estimate: Previous Estimate and Measured Value give the current estimate.

$EST_t=EST_{t-1}+KG[MEA-EST_{t-1}]$ c. Calculation of New Error in Estimate: Finally, all the above 2 values obtained are used to obtain the new error in estimate.

$E_{ESTt}=[1-KG]*(E_{ESTt-1})$

Here, it is being used to find accurate coordinates of the corners of the marker, which is being used to improve the marker detection and reduce the jitter which is happening otherwise.

The server uses the above-explained marker detection method to determine several parameters associated with the movement of the vehicle. For instance, Step 307 includes pose estimation of the vehicle. Pose estimation is identification of the 3-dimensional world coordinates of a point on an object with respect to a camera. It signifies the distance of the object from a camera and the orientation of the object. Camera Matrix and related parameters defined as follows define a window for the system of the present invention to anticipate real world measurements. The pose is being calculated with respect to the camera that is able to visualize the vehicle. In case the vehicle is visible in all the cameras then individual pose from respective cameras are summed up and an average pose model is estimated, which gives us where the car is with respect to the visualizing cameras.

Camera Matrix: This consists of focal points and the principal point of the camera as mentioned below:

$$\begin{bmatrix} f_x & 0 & c_x \\ 0 & f_y & c_y \\ 0 & 0 & 1 \end{bmatrix}$$

The values mentioned in the matrix can be found by using these formulas, given the field of view and the image plane dimensions as listed in the data sheet $fx=\text{img.width}/2*\tan(FOV/2)$ $fy=\text{img.height}/2*\tan(FOV/2)$ $cx=fx/2$ $cy=fy/2;$ wherein,
  fx and fy are focal length in x and y direction respectively.
  FOV=field of view of the camera lens
  Tan=tangential
  cx and cy are coordinates of principal point.

Camera Parameters: A camera model consists of Intrinsic and Extrinsic parameters out of which, camera matrix being the Intrinsic parameter is derived above. Extrinsic parameters consist of Rotation and Translation vectors which are represented as follows:

$$\begin{bmatrix} X_c \\ Y_c \\ Z_c \end{bmatrix} = [R|t] \begin{bmatrix} X_w \\ Y_w \\ Z_w \\ 1 \end{bmatrix}$$

where, $$\text{rotation } Mat = \begin{bmatrix} r_{00} & r_{01} & r_{02} \\ r_{10} & r_{11} & r_{12} \\ r_{20} & r_{21} & r_{22} \end{bmatrix} = \begin{bmatrix} f\cos\theta & -f\sin\theta & ft_x \\ f\sin\theta & f\cos\theta & ft_y \\ 0 & 0 & t_z \end{bmatrix}$$

$$projectionMat = cameraMat * extrinsicMat$$

$$projectionMat = \begin{bmatrix} f_x & 0 & c_x \\ 0 & f_y & c_y \\ 0 & 0 & 1 \end{bmatrix} * \begin{bmatrix} r_{00} & r_{01} & r_{02} & t_0 \\ r_{10} & r_{11} & r_{12} & t_1 \\ r_{20} & r_{21} & r_{22} & t_2 \end{bmatrix}$$

$$projectionMatrix = P = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix}$$

ii. Then using Perspective n point problem, the pose of the marker is estimated. Inverse of Marker Object pose is Camera Pose $$\text{camera Pose} = -1.0 * \begin{bmatrix} r_{00} & r_{01} & r_{02} \\ r_{10} & r_{11} & r_{12} \\ r_{20} & r_{21} & r_{22} \end{bmatrix} * \begin{bmatrix} tvec_x \\ tvec_y \\ tvec_z \end{bmatrix}$$

Figure 6:
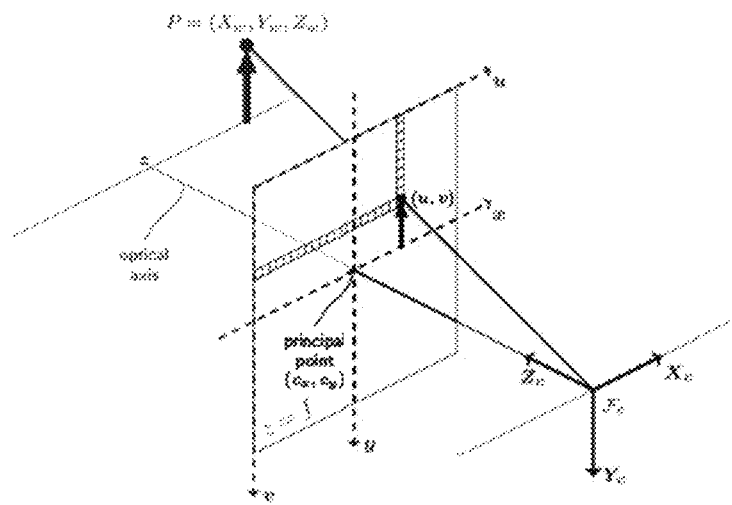
FIG. 6 illustrates camera coordinates of a camera in the smart driving yard, according to the embodiments of this invention.

The camera coordinates are illustrated in FIG. 6.

Further, step 308 includes distance estimation of the vehicle, which forms another parameter related to the movement of the vehicle. To find the distance between camera and the matrix, 3-dimensional coordinate of the marker needs to be found which is done as follows:

1. Calculation of the projection matrix is done by simple matrix multiplication of intrinsic and extrinsic matrices.

$$projectionMat = cameraMat * extrinsic Mat$$

$$projectionMat = \begin{bmatrix} f_x & 0 & c_x \\ 0 & f_y & c_y \\ 0 & 0 & 1 \end{bmatrix} * \begin{bmatrix} r_{00} & r_{01} & r_{02} & t_0 \\ r_{10} & r_{11} & r_{12} & t_1 \\ r_{20} & r_{21} & r_{22} & t_2 \end{bmatrix}$$

$$\text{projection Matrix} = P = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix}$$

1. Homography matrix is obtained from this projection matrix.

$$H = \begin{bmatrix} p_{11} & p_{12} & p_{14} \\ p_{21} & p_{22} & p_{24} \\ p_{31} & p_{32} & p_{34} \end{bmatrix}$$

1. Inverse Homography can be calculated by taking the inverse of the homography matrix obtained above.
1. The center of the marker is taken in the following 3×1 matrix form:

$$\text{center Of Marker} = \begin{bmatrix} center_x \\ center_y \\ 1 \end{bmatrix}$$

1. Inverse Homography and 2D point is then multiplied to obtain a 3D point of the center of the marker. 3D point is normalized w.r.t Z axis.

$$\text{point } 3D = \begin{bmatrix} X \\ Y \\ Z \end{bmatrix} = H^{-1} * \begin{bmatrix} u \\ v \\ 1 \end{bmatrix}$$

Figure 5:
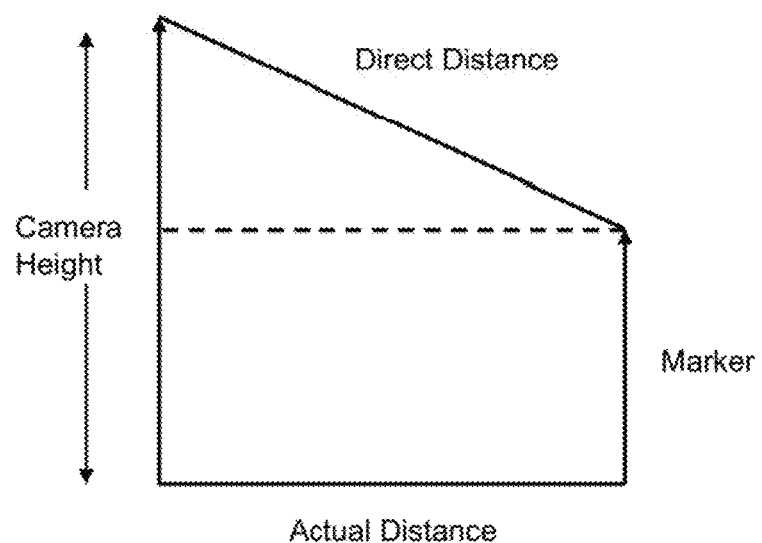
FIG. 5 illustrates a representation of a distance between a camera in the smart driving yard and a marker on the vehicle, according to embodiments of this invention.

1. Finally, as illustrated in FIG. 5, distance of the camera to the marker is calculated, by keeping camera as the origin from the following formula:

$$d = (x_2 - x_1)^2 + (y_2 - y_1)^2 + (z_2 - z_1)^2)^{1/2}$$

$$a = \sqrt{(d^2 - h^2)}$$

Where,
 a→Actual Distance
 d→Direct Distance
 h→Height of camera

Once the desired parameters related to the movement of the vehicle are calculated, the server performs step 309, which includes plotting the coordinates of the vehicle on a 2-dimensional (2D) geographical map of the driving yard that is illustrated in FIG. 1. Plotting the coordinates on 2D Map is achieved as follows:

1. Homography between the scene in the video and map is obtained.

$$\text{offset Multiplier Mat} = \begin{bmatrix} 1 & 0 & x_{offset} \\ 0 & 1 & y_{offset} \\ 0 & 0 & 1 \end{bmatrix}$$

$$\text{estimated Planar Homography} = \begin{bmatrix} h_{00} & h_{01} & h_{02} \\ h_{10} & h_{11} & h_{12} \\ h_{20} & h_{21} & h_{22} \end{bmatrix} * \begin{bmatrix} 1 & 0 & x_{offset} \\ 0 & 1 & y_{offset} \\ 0 & 0 & 1 \end{bmatrix}$$

1. The center of the marker is then multiplied by this homography matrix in order to obtain its coordinates on the map.

$$\text{point } 2D\text{ Mat} = \begin{bmatrix} X' \\ Y' \\ w \end{bmatrix} = \text{estimated Planar Homography} * \begin{bmatrix} center_x \\ center_y \\ 1 \end{bmatrix}$$

1. The obtained point is then normalized by dividing by a scaling factor w $$\text{point } 2D = \begin{bmatrix} X' \\ Y' \\ w \end{bmatrix} / w$$

1. Finally, the obtained coordinates are then subtracted from the 2D-map dimensions in order for them to be plotted on the map.

point2D·x=yardmap·width−point2D·x point2D·y=yardmap·height−point2D·y

Figure 7:
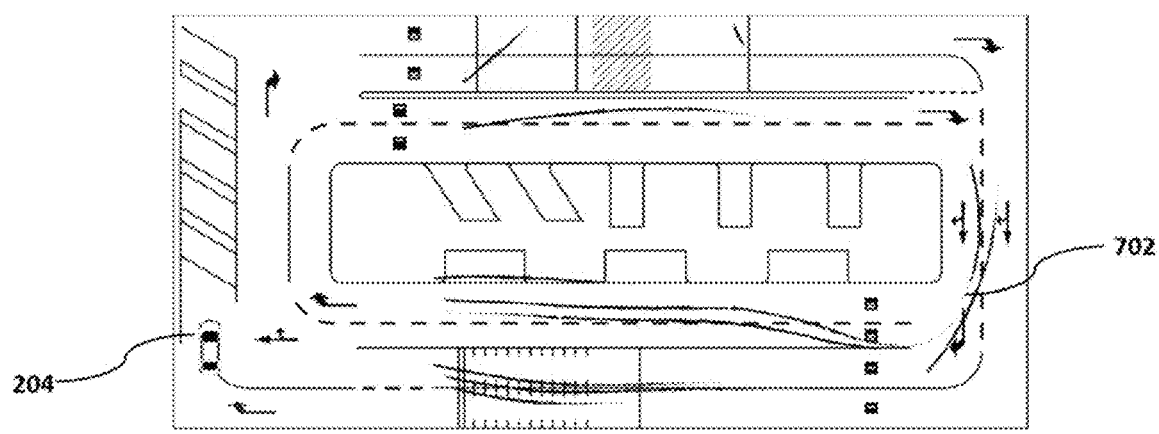
FIG. 7 illustrates a top-view of the smart yard along with vehicle tracking using markers, according to embodiments of this invention.

As illustrated in FIG. 7, the lines 702 indicate tracks of the respective detected markers of the vehicle in the driving yard. From these detected markers, the position and pose of the car 204 is calculated and is then plotted on the 2D minimap. A person skilled in the art would appreciate that colors can vary and they are included only for representation here. Further, the markers may be located either on the top, left, right and front side of the vehicle or 2 markers on the side of the vehicle. The locations of these markers on the cars is already known and precise. Therefore, the system can autonomously identify where exactly in terms of length, breadth and height the marker is physically stuck on car. Further, as illustrated in FIG. 7, Pixel Ratio along Width: 1800 px/70 m
Pixel Ratio along Height: 875 px/35 m $$\text{camera Pose} = -1.0 * \begin{bmatrix} r_{00} & r_{01} & r_{02} \\ r_{10} & r_{11} & r_{12} \\ r_{20} & r_{21} & r_{22} \end{bmatrix} * \begin{bmatrix} tvec_x \\ tvec_y \\ tvec_z \end{bmatrix}$$

Figure 8:
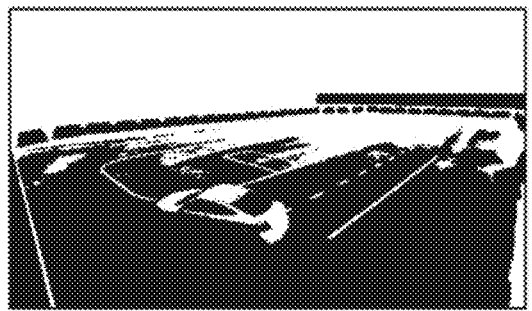
FIG. 8 illustrates a representation of a yard mask, according to embodiments of this invention.
Figure 8:
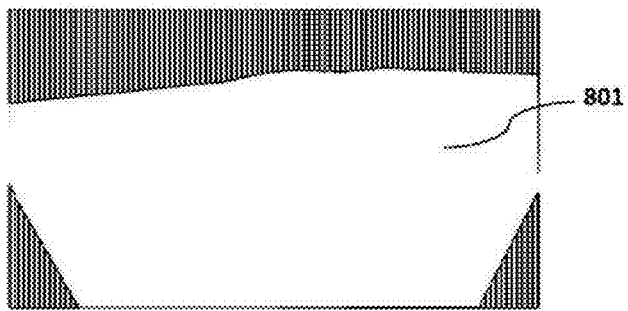

Step 310 includes yard estimation as illustrated in FIG. 8. This figure represents a yard mask that is generated by the server and camera image. The mask when multiplied with the cam image produces only the yard area which is the region of interest. Yard Segmentation would be achieved by the following steps:

1. Multiple images of such masks with white portion as ROI would be created from extracted frames of videos and then these would be increased in numbers by using simple data augmentation techniques such as rotating the images.
2. Once the dataset is ready, autoencoders would then be used to segment these out from original images such as the image given above.

| Encoder | | | |
|---|---|---|---|
| Conv1 | Conv2 | Conv3 | Conv4 |
| 64 | 128 | 256 | 512 |

| Decoder | | | | | | | |
|---|---|---|---|---|---|---|---|
| DeConv1 | DeConv2 | DeConv3 | DeConv4 | DeConv5 | DeConv6 | DeConv7 | DeConv8 |
| 256 | 256 | 256 | 128 | 128 | 128 | 64 | 1 | a. The basic idea in the design of this architecture is to create a shallow encoder, since the binary segmentation task does not require advanced data processing, obtaining a very simple code (also called "bottleneck") little elaborate.

b. The decoder part instead is deeper and would reconstruct the grayscale output slowly and precisely.

| Layers | Kernel | Stride | enters machine |
|---|---|---|---|
| CONV1 | (3, 3) | (2, 2) | Relu |
| CONV2 | (3, 3) | (2, 2) | Relu |
| Conv3 | (3, 3) | (2, 2) | ReLU |
| Conv4 | (3, 3) | (2, 2) | ReLU |
| DeConv1 | (3, 3) | (2, 2) | ReLU |
| DeConv2 | (3, 3) | (1, 1) | ReLU |
| DeConv3 | (3, 3) | (1, 1) | ReLU |
| DeConv4 | (3, 3) | (2, 2) | ReLU |
| DeConv5 | (3, 3) | (1, 1) | ReLU |
| DeConv6 | (3, 3) | (1, 1) | ReLU |
| DeConv7 | (3, 3) | (2, 2) | ReLU |
| DeConv8 | (3, 3) | (1, 1) | Linear | c. The encoder would be made up of 4 convolutive levels each with kernel size 3×3, ReLU as activation function and 2×2 stride. The encoder input is 480×720×3 and the number of output channels is from 64 to 512, doubling for each layer.

d. For the part of decoder, there should be 8 de convolutional layers, of these 3 with number of output channels equal to 256, 3 with number of output channels equal to 128, the penultimate to 64 and 1 last with a single channel.

e. Of the first 6 initial layers, only 4 have 1×1 stride, while the remaining 2 stride 2×2, together with the last two deconvolutive layers.

f. All deconvolutions apply the ReLU as an activation function, except for the last layer in which a linear activation function is used.

g. This autoencoder architecture has been associated with an MSE loss function and the ADAM optimizer because of which it is possible to apply backward propagation and modify the weights of all the layers with respect to what the segmentation is doing wrong.

Referring back to FIG. 3, the steps 305 to 309 that are executed to process a detected marker, may also be executed simultaneously to individually process multiple markers. For example, steps 314 to 318 indicate this simultaneous processing of another marker. This process can be replicated for several markers simultaneously.

In step 312, the marker locations of all markers are fused together to estimate the final vehicle location. The fusion means that each marker position in the real world is calculated and then averaged out so as to obtain a single center (x, y) with respect to the 4 or more cameras in the system. Each marker will have a (x, y) coordinate with respect to the 2D map of the driving yard, estimated from KLT and pose estimation. These form as the input to the summation module wherein based on the confidence of the pose information captured from the pose estimation module, we include the respective marker (x,y) to calculate the weighted average.

In step 313, traffic violations committed by the driver are detected based on the inputs received from step 312 as well as speed and direction estimates from step 311. The system, thus, describes the driving performance of the driver of the vehicle in relation to any committed violations e.g. overspeeding, lane intersection, number of forward and reverse maneuvers during parking and brake application stats to an extent of less than 10 cm of accuracy.

Once any of the markers is detected, information about the center of the car can be calculated as the system is already aware about the pose of the markers. The center of the vehicle is calculated by taking the weighted average or Bayesian estimation of the centers estimated from all the cameras as illustrated in the context of FIGS. 2*a*-2*k*. Further, the wireframe model of the vehicle is then marked using this center and its orientation. Herein, the more the number of markers detected on the car, the better is the approximation of the center. After calculating the center location of the vehicle on the 2D map, the 4 vertices of the vehicle's cuboid are also estimated.

By using the lane model, the system can predict if any of these lane markers are intersected by the car cuboid and trigger violation alarms respectively. Thus, the lane model assists the system in concluding whether the driver has committed any lane violations or whether there are any flaws in the driving performance. Additionally, the system can also generate over-speeding alarms and motion in the wrong direction. The system can also predict back roll on the ramp with centimeter accuracy.

In the above embodiments, a lane model is a set of all the 2-dimensional points describing the lanes (e.g. lines in FIG. 8) on the 2-dimensional map along with information where the prescribed tests need to be started or ended e.g. parallel parking test, ramp rolling test, braking tests etc. This information collectively describes how the driver is performing in terms of driving through the test.

Figure 9:
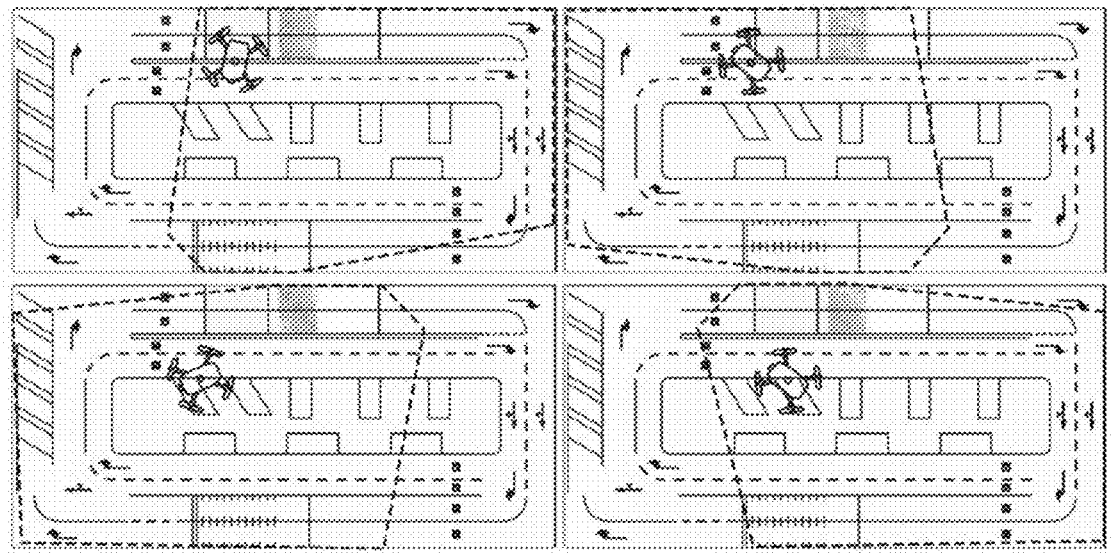
FIG. 9 illustrates different camera views that detect a vehicle occluding one or more lanes on the yards.

In some embodiments, the parking violations may also be detected even without the presence of markers on a vehicle. This can be achieved by dividing lanes in the driving yard into separate regions of interest (ROIs) and detecting occlusion of these ROIs by the vehicle. The occlusion indicates a lane crossing by the vehicle which further indicates that either the vehicle is committing a parking violation or a lane change violation. For instance, FIG. 9 illustrates camera views from different cameras that detect a vehicle occluding one or more lanes on the yards. Even though markers are not explicitly needed, such a system may still be implemented along with the markers to improve the accuracy of the system.

In some embodiments, the system for pose and position estimation can be deployed in vehicle parking lots, or smart driving yards, driver testing yards, or any other location with pre-defined markers on the road for vehicle or object pose & position estimation.

Figure 10:
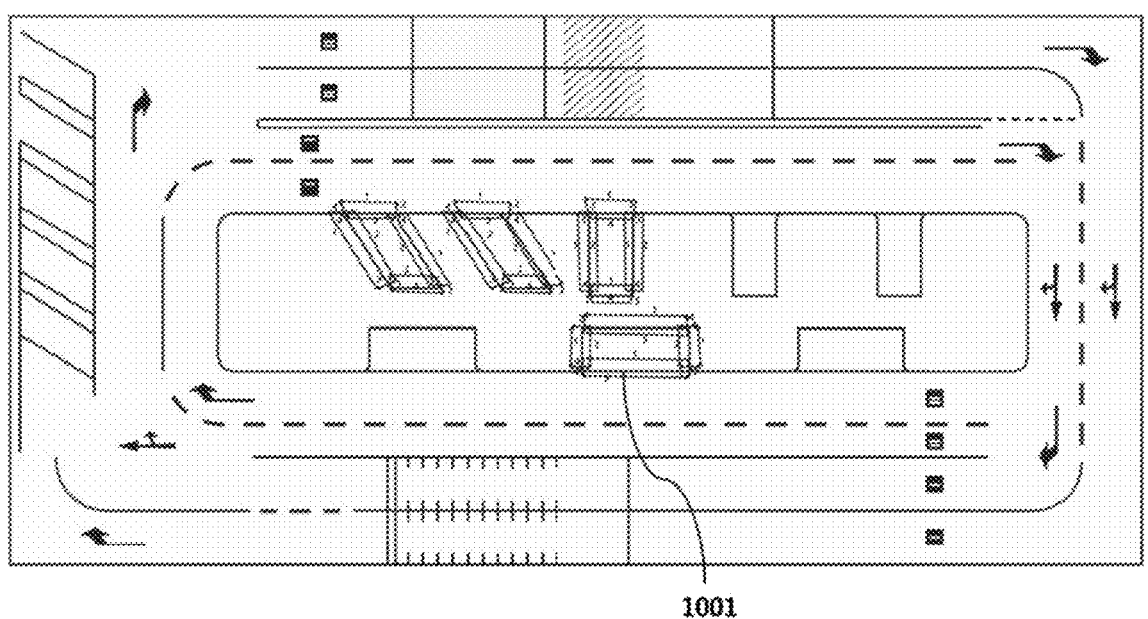
FIG. 10 illustrates a 2d-map that includes markings of regions of interest for occlusion detection.

FIG. 10 illustrates a 2d-map that includes markings of ROIs. The ROIs marked here should be marked in such a manner that no other nearby edge of the parking zone is included. The objective is for a camera to detect whether any part of the ROI is being occluded or not to determine a violation. The edges of the parking zones are divided into multiple smaller ROIs which are then used to train the model which further detects occlusion and accordingly raises an alarm. Herein, the invention uses a sliding window that slides across the line segment-enclosed ROI. Thus, a rectangular ROI is sliced into perfect squares without further tampering the rectangular region by geometrical constraints that may distort the ROI image.

The following is a snippet of configuration file which stores several parameters.
  captureDataSet: 1
  frameSkipSampleRate: 5

The most important parameters for Data Capturing are mentioned in the above screenshot.
  captureDataSet—If this is set to 1, then data starts capturing
  If this is set to 0, then data would not be captured
  frameSkipSampleRate—This parameter denotes the number of frames to be skipped each time a frame is captured.

The next step is data cleaning. This is probably the most important step in the entire pipeline as the accuracy of the Deep Learning model would be largely dependent on cleanliness of the data. As the model is a Binary classifier, hence it contains the following 2 categories:
  Occluded—If the ROI is not visible either fully or partially,
  Non-Occluded—If the ROI is fully visible or if it is covered by a shadow For marking the ROIs for lane/line classifier, the present invention does not rely on manually cropping the ROIs if the camera is displaced by external means or in other words, the camera view changes. There is already a 2d-map of the yard drawn to scale, as described previously in this disclosure. The map and the real yard have some features that are relevant in plotting and calibrating the areas. The features include the corners/edges of the parking lot markings and other lanes/lines drawn/painted on the yard. The invention relies on these features in marking corresponding points (coordinates) on the 2d-map. This correspondence is then described by the homography between the camera plane and the 2D map in mathematical terms. This provides a homography matrix which when multiplied or taken inverse of, can transform points from one plane to the other (camera 2 map or vice versa).

The above technique thus reduces the time taken in manually marking the ROIs in the each of the 4 camera views illustrated in FIG. 9. Instead, we only do it once in the initial setup phase where we draw the ROIs only on the map and they are then automatically transformed to camera planes using homography.

Additionally, the bird's eye view of the system provides a deep insight of what and how the car driver is performing in terms of maneuvers/violations. The parking ROIs are continuously sampled using deep learning and violations of car occluding any of the lines (ROI marking) on the yard is sent as triggers. Not all ROIs are sampled by all the cameras at an instant, instead only ROIs that are relevant, close by or that present a good viewing angle through respective cameras are included in taking consensus of the violation.

Referring back to FIG. 3, after the test is over, a comprehensive report of all the violations incurred during various maneuvers is generated and is sent to the authorities as well as to the end user. Such maneuvers may include, but not limited to, Garage parking, Speeding, Ramp climbing and Emergency lights etc. In some embodiments, the invention may employ a Unity Engine for driving a Car Remotely and getting a score on whether a driver passed or not in a driving test.

In another embodiment, the driving test performance results are sent to a series of specialists or workers to validate the results of the system.

In another embodiment, the method of determining the position and pose of a vehicle in a parking lot, driving yard or another location with markings on the road.

In an aspect, the method implemented by the proposed artificial intelligence (AI) based system may be described in general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

In some embodiments, the one or more AI algorithms and/or ML algorithms are configured to learn and evolve based on the manual annotations by retraining one or more AI algorithms and/or ML algorithms with more new data that is pouring into a pool of training data. In some embodiments, the manual annotation techniques are selected from any or combination of Lanes, 2D bounding polygons for various objects, Selection images, Number entry, Road segmentation, and 3D polyhedral shapes for various sides of an object to be detected. This disclosure and the detailed techniques have also been covered in the preceding priority patent application.

In some embodiments of this invention, the objective is to find the velocity and motion of the vehicle which is in the field of view of the camera. Road Safety and Traffic Monitoring is done through real-world visual monitoring using cameras. In particular, the cameras are used for collecting visual data and providing video analytics and data with the use of people, computer vision and artificial intelligence. This work addresses monocular vehicle velocity estimation, which uses input from a camera only rather than different sensors. Vehicle velocity estimation as such is not a new subject of interest, since it is extensively studied in the context of traffic surveillance, where, however, a stationary camera is employed. Under the restriction of a fixed camera pose the problem becomes significantly less complex, since with a calibrated camera system angular measurement can be obtained and from these measurements velocity estimates can readily be established. In contrast in our case the observer resides on a moving platform and inferring velocity in a similar fashion would require additional information such as camera pose, ego-motion and foreground-background segmentation. Very recent research shows that estimating ego-motion as well as disparity maps from monocular camera images by means of structure from motion is indeed possible, but still limited. Semantic segmentation of scenes, which is a fundamental problem in computer vision, has also more recently been tackled using deep neural networks.

The dataset used for this project is the velocity estimation challenge dataset provided by tuSimple for a competition for CVPR 2017 conference. The goal of this challenge is to estimate the motion and position of vehicles relative to the camera. To perceive the dynamic surroundings of the autonomous vehicle is a critical task to achieve autonomous driving. The information about the position, as well as the motion of the agents in the vehicle's surroundings plays an important role in motion planning. Traditionally, such information is perceived by an expensive range sensor, e.g LiDAR or MMW radar. In this challenge, we provide a challenge task to encourage people to think creatively about how to solve the velocity and position estimation problem by using only information from cameras. In this challenge, the participants were required to develop algorithms to estimate the velocity and the position of designated vehicles on given test clip. A set of over 1000 2-second-long video clips are provided, with velocity and positions generated by range sensors of vehicles on the last frame. We also provide human-annotated bounding boxes for vehicles on over 5,000 images as supplementary training data. Apart from the training and supplementary data we provide, external data sources are also allowed to be used to help the algorithm's learning process.

According to the above embodiments of this disclosure, optical flow or optic flow is the pattern of apparent motion of objects, surfaces, and edges in a visual scene caused by the relative motion between an observer and a scene. Optical flow can also be defined as the distribution of apparent velocities of movement of brightness pattern in an image. The field of optical flow has made significant progress by focusing on improving numerical accuracy on standard benchmarks. Flow is seen as a source of input for tracking, video segmentation, depth estimation, frame interpolation, and many other problems. It is assumed that optimizing for low EPE will produce flow that is widely useful for many tasks. EPE, however, is just one possible measure of accuracy and others have been used in the literature, such as angular error or frame interpolation error. While there is extensive research on optical flow, here we focus on methods that use deep learning because these can be trained end-to-end on different tasks with different loss functions. Applying learning to the optical flow problem has been hard because there is limited training data with ground truth flow. Early approaches used synthetic data and broke the problem into pieces to make learning possible with limited data.

Figure 11:
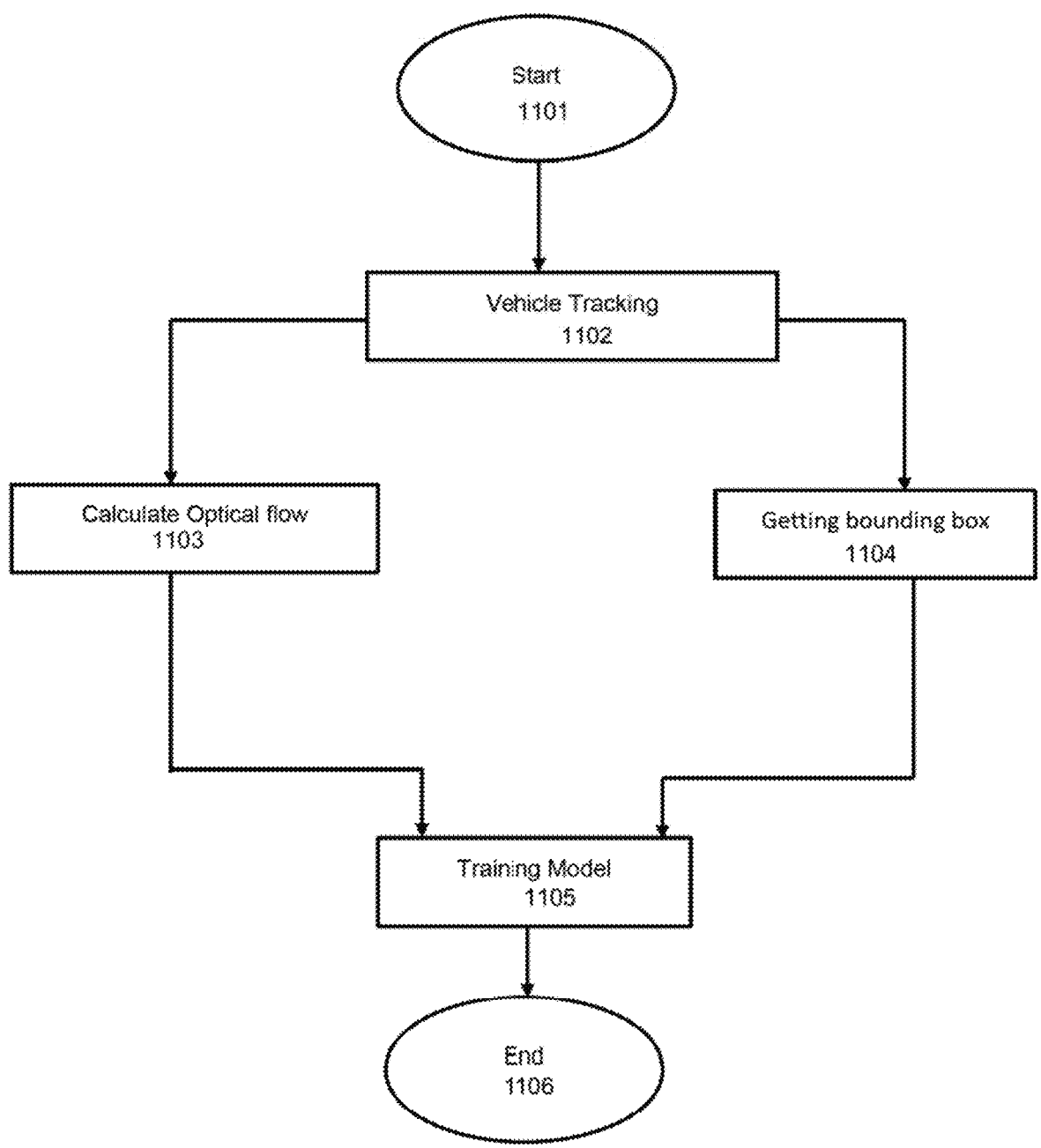
FIG. 11 illustrates the steps followed for vehicle tracking, in accordance with the embodiments of this invention.

To study the motion of the vehicle and to estimate the velocity of the vehicle we studied the change in the size of the bounding boxes and also the change in the optical flow. FIG. 11 illustrates the steps followed for velocity estimation:
Training (1105)
Applied tracking algorithm on each sequence of 40 frames (1102).
Match the bounding boxes of each tracker on the 40th frame with the bounding boxes given by the tracker for selecting the trackers (1104).
Calculate the optical flow for each bounding box sequence (1103).
Preprocess the optical flow and bounding box data
Train the model with the data of 40 frames ie a single frame using time distributed layers in Keras.

Figure 12:
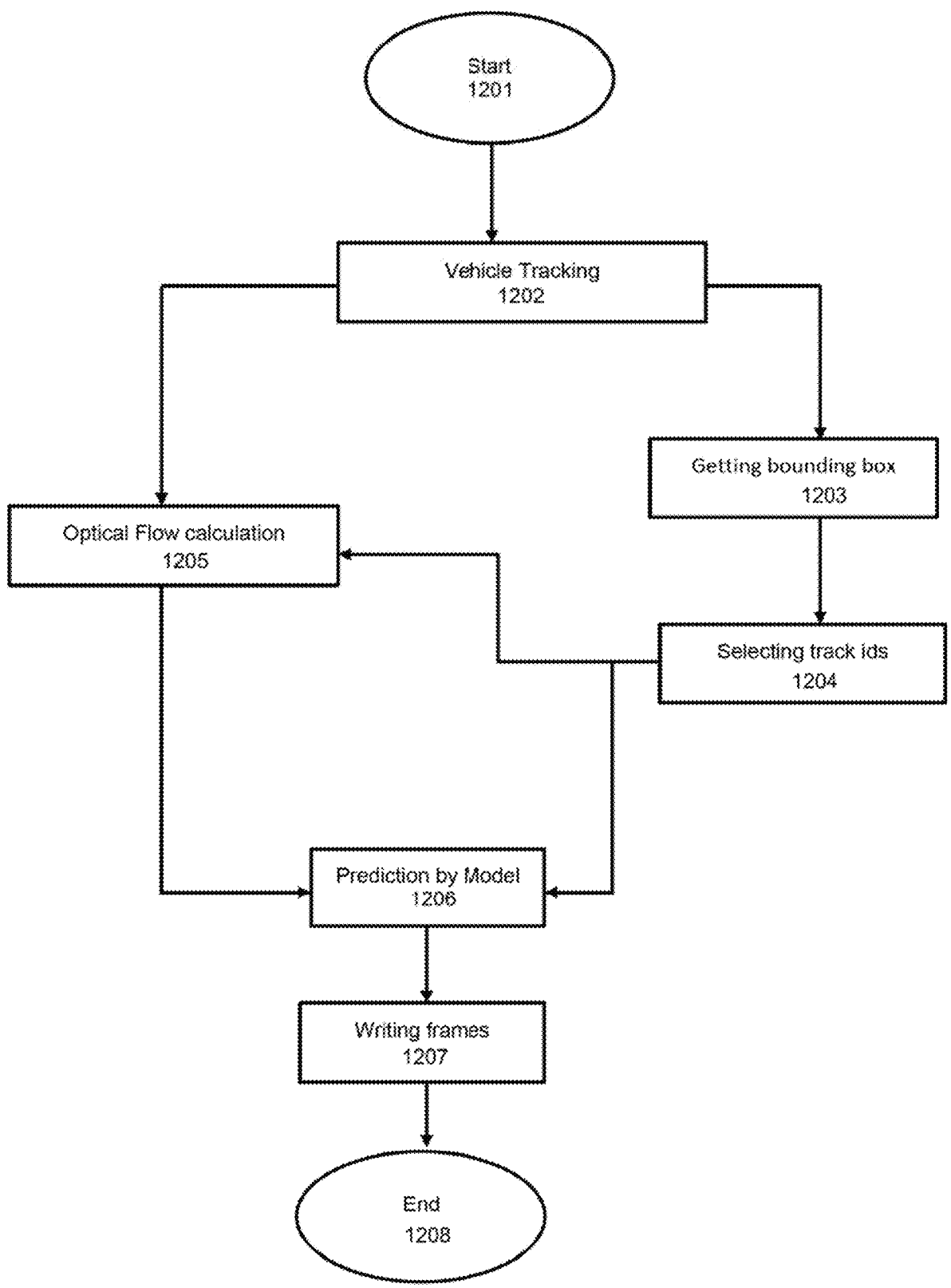
FIG. 12 illustrates the steps or process used for training or deployment, in accordance with the embodiments of this invention.

FIG. 12 illustrates the steps or process used for training or deployment:
Testing/Deploying o Capture the Frames
Run tracking algorithms (1202)
Select tracks with least missing frames (1204)
Calculate the optical flow for the selected tracks (1205)
Pass the data to the saved prediction model (1206) to get the velocity estimations
Write on the frames of the videos (1207).

We trained 3 models with different number of layers and for different number of epochs the accuracy and loss for each model has been shown below.

TABLE 1

Accuracy and Loss for trained models

| Model Version | Accuracy | Loss |
| --- | --- | --- |
| Model 1 | 0.6909 | 1.55 |
| Model 2 | 0.6992 | 2.77 |
| Model 3 | 0.706 | 2.303 |

Table 1 above illustrates the results for experimentations on the models. For comparing models, we are using two parameters that are accuracy and loss. Accuracy of a model should be higher and loss should be low to be a good usable model.

Hence after all the experimentation, the real time vehicle detection on edge and velocity and motion estimation was completed successfully. All the work done can be improved further but incorporating new discoveries in computer science. For vehicle detection we used MobileNet SSD v1 for deployment as it was small in size and was able to detect a good number of vehicles and also had a high FPS. In case vehicle estimation we used model 3 which had higher accuracy and near average loss.

Figure 13:
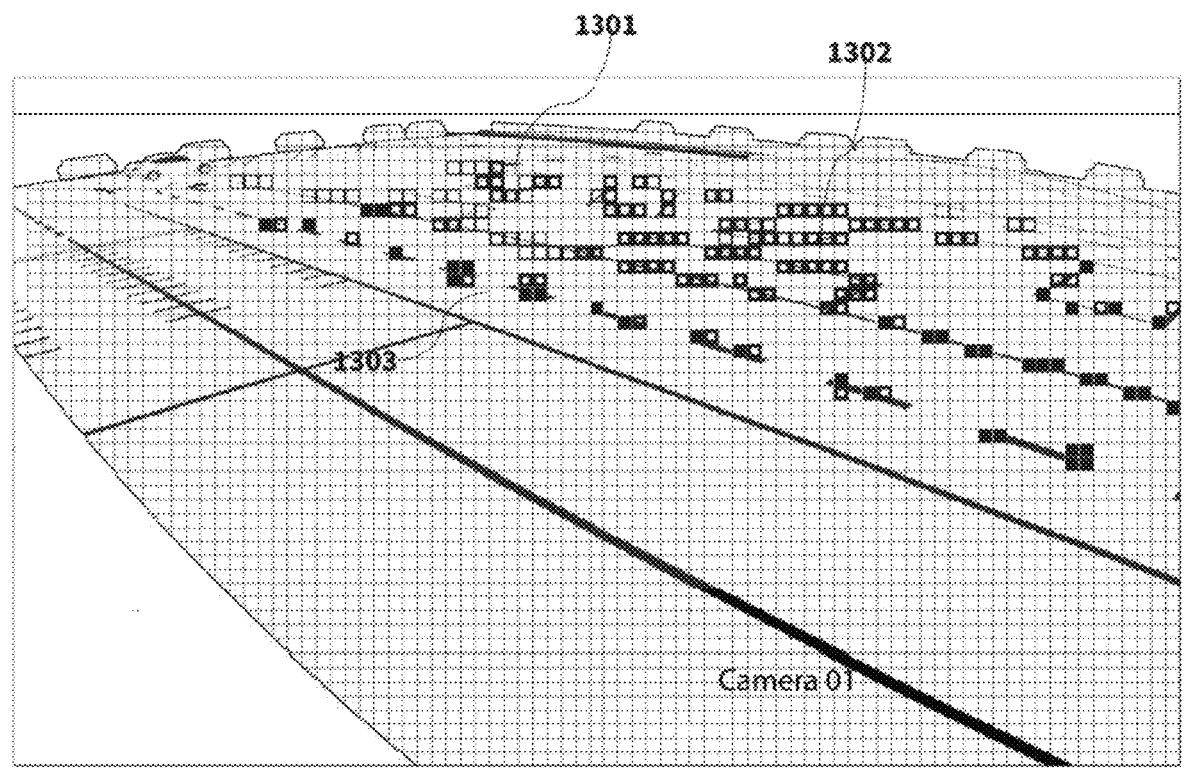
FIG. 13 illustrates a grid map of the yard in accordance with some embodiments of this disclosure.

FIG. 13 illustrates a grid map 1303 of the yard. In accordance with some embodiments of the invention, the driving yard can be divided into several small grids 1301 and 1302. Each grid can take a square or a rectangular shape and can be combined with other grids for further analysis. The grids may, individually or in combination with each other, be used to determine occlusion of the lines on the driving yard. Some of the colored grids, for instance, represent the occluded portions of the lines in the driving yard.

Figure 14:
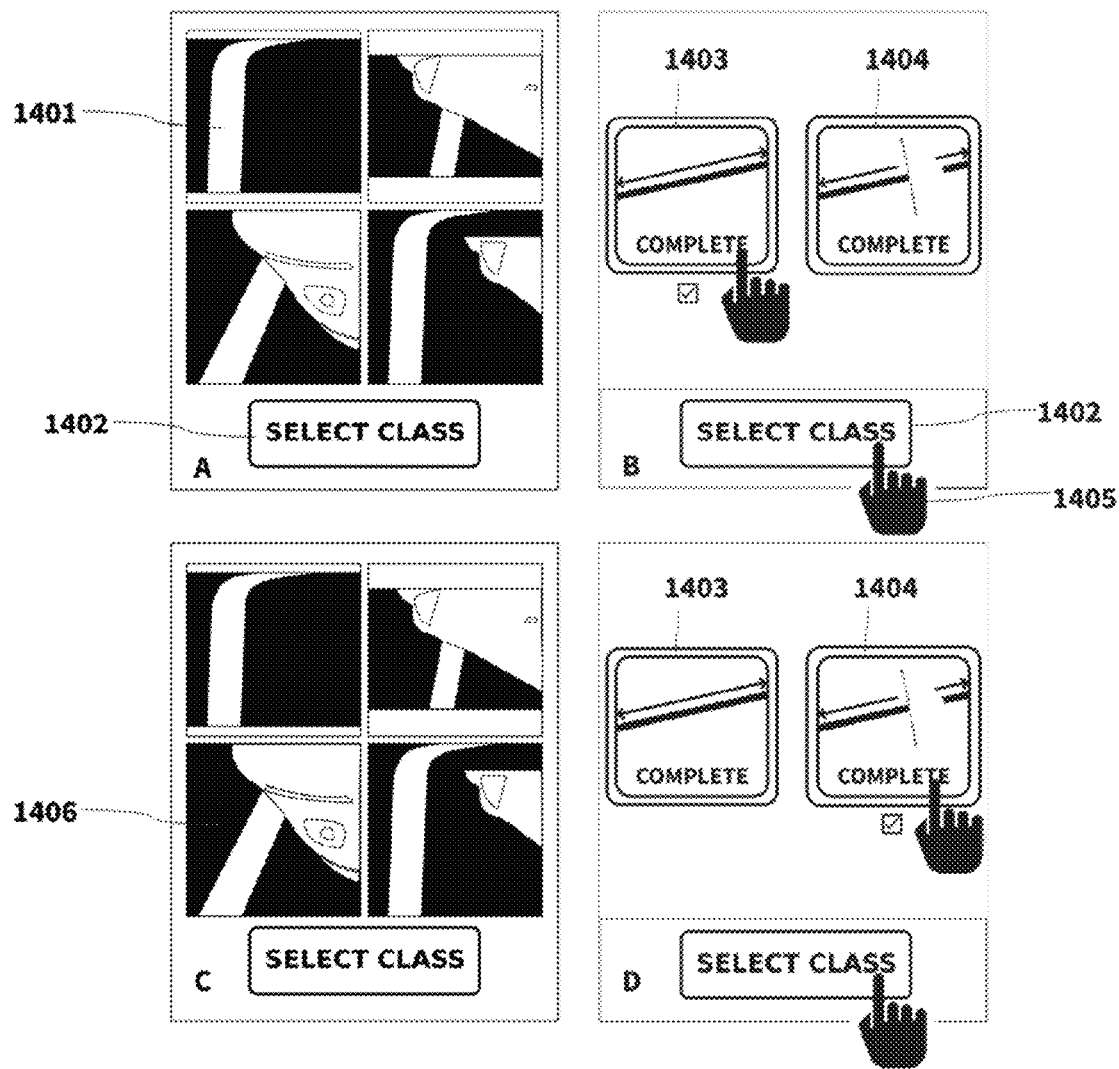
FIG. 14 illustrates an exemplary workflow for a user to provide inputs on images provided to them for validation.

FIG. 14 illustrates an exemplary workflow for a user to provide inputs on images provided to them for validation. A user can be represented multiple images of various objects and may be prompted to select a class 1402 for an object. The user can see the represented image and select the relevant class. The two images on the right-hand side of FIG. 14 illustrate examples that the user can use as reference to provide his inputs on the images displayed on the left-hand side of FIG. 14.

Figure 15:
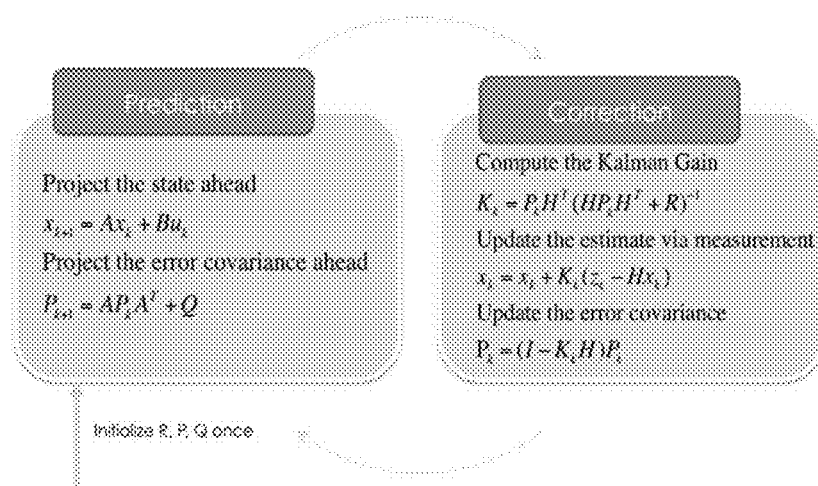
FIG. 15 illustrates the use of a Linear Kalman Filter to refine marker corner detection, reducing jitter and improving accuracy.

FIG. 15 illustrates an exemplary workflow for using a Linear Kalman Filter to accurately determine the coordinates of the corners of a marker. The filter improves marker detection by reducing jitter that may otherwise occur. The left-hand side of FIG. 15 shows the initial detected marker corners, while the right-hand side illustrates the refined corner coordinates after applying the Linear Kalman Filter, demonstrating enhanced stability and precision.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. An artificial intelligence (AI) based computer vision (CV) system for pose and position estimation for objects vehicles (204), moving or parked in a driving yard (200) and/or parking lot, comprising:
   a network of cameras (202) to automatically capture a series of images or videos of one or more vehicles (204) with one or more installed markers and configured to move in a predefined area;
   a memory having embodied therein one or more routines operable to detect the one or more vehicles (204) from one or more markers installed on the one or more vehicles in the series of images or videos using Artificial Neural Networks; and
   one or more processors coupled to the memory and operable to execute the one or more routines to:
   detect a pose of each of the one or more markers from the series of images or videos;
   determine one or more parameters related to a movement of the one or more vehicles (204) in the predefined area based on detection of the pose of the one or more markers; where such parameters are 2D location, speed and direction of the vehicle (204);
   implementing the fusion of marker locations together from each camera within the network of cameras (202) to estimate the final vehicle location;
   implement a calibration technique to match frames from the cameras to the a 3-dimensional (3D) world; and
   plot regions of interest on the 3D world onto a 2-dimensional (2D) layouts of the 3D world;
   automatically detect one or more driving violations committed by the one or more vehicles (204) based on the determined one or more parameters;
   wherein the one or more processors are further configured to:
   synchronize frames from the cameras (202) such that all frames from the one or more cameras (202) are of the same time stamp to generate the most accurate pose and position of the objects or vehicles (204);
   synchronize frames from the cameras (202) using multi-threading, wherein a synchronizer thread and a processing thread are initiated on the launch of the program and separate capture threads are launched that start capturing the frames at their respective speed;
   enable the synchronizer thread to estimate a slowest camera (202) based on a first frame received from the slowest camera (202), wherein the first frame forms an index key; and send the index key to the processing thread, which starts querying frames for the remaining cameras (202).

2. The system of claim 1, wherein the pose of a vehicle (204) can be determined by AI using markers on the vehicle (204) or the geometry of the vehicle (204) or the markers on the vehicle can be equivalent to the geometry of the vehicle.

3. The system of claim 1, wherein the one or more cameras (202) are installed on one or more poles or high-altitude structures, which are either stationary or mounted on drones.

4. The system of claim 1, wherein the one or more processors are further configured to share the series of images or videos with a network of specialist and workers to validate CV system-generated judgements of the driving violations or regions of interest or Events of interest associated with the one or more vehicles (204).

5. The system of claim 4, wherein the processor is further configured to:
   implement autocalibration of the view of a camera (202) by matching the points of interest across a new frame and a previous frame, wherein the points of interest are calculated using feature detection method,
   calculate a displacement between the new and the previous frames using an image processing algorithm,
   add the displacement to reference points that are manually or automatically labelled on reference camera frame, and
   update a homography for the camera (202) based on the displaced reference points.

6. The system of claim 5, wherein the one or more processors implement the calibration technique for the cameras (202) to estimate the one or more parameters related to the movement of the vehicle (204), wherein the one or more parameters comprise a geographical location of the movable object, a pose of the movable object with respect to the one or more cameras, a speed of the movable object, a velocity of the movable object, a direction of movement of the movable object and an orientation of the movable object.

7. The system of claim 6, wherein the processor is further configured to: estimate the pose and the geographical location of the movable object based on the pose and the geographical location of the one or more markers; plot the geographical location of the movable object on a 2-dimensional (2D) layout of the predefined area; and detect the one or more driving or parking violations based on movement of the movable object on the 2D layout.

8. The system of claim 7, wherein the processor is further configured to: individually estimate center coordinates of the movable object based on respective visuals captured from each of the one or more cameras (202); calculate center coordinates of the movable object by calculating a weighted average or Bayesian estimation of the individually estimated center coordinates; construct a wireframe model of the movable object based on the estimated center coordinates and an orientation of the movable object; and represent the wireframe model of the movable object on the 2D layout.

9. The system of claim 8, wherein the events of interest comprise a vehicle, a pose of the vehicle, the vehicle overlapping on 3D world lane markings on roads.

10. The system of claim 9, wherein the processor is further configured to generate a performance evaluation report of a driver of the movable object, based on the detected one or more driving violations.

11. The system of claim 10, wherein the one or more driving violations comprise one or more of parking violations, maneuvering violations, speeding Violations, breaking Violations and ramp-climbing violations and violations related to driver behavior which comprises gaze detection, head movement, distractions, seat belts and driver's hands location.

12. The system of claim 11, wherein the one or more cameras (202) are communicatively attached to one or more drones that are configured to fly over the predefined area.

13. The system of claim 12, wherein the processor is further configured to: mark one or more regions of interest (ROI) on the 2D-map; detecting one or more ROIs that are occluded by the movable object; determining one of the one or more violations based on detecting the occluded ROIs.

14. An artificial intelligence (AI) based computer vision (CV) method for detecting pose and position estimation for objects vehicles (204), moving or parked in a driving yard and/or parking lot (200), the method comprising:
  one or more routines stored in a memory, operable to detect one or more vehicles (204) from one or more markers installed on the one or more vehicles in a series of images or videos using Artificial Neural Network;
  capturing, by one or more or network of cameras (202), one or more visuals of one or more markers installed on a movable object that is configured to move in a predefined area;
  detecting, by a processor in communication with the one or more or network of cameras (202), a pose of each of the one or more markers from the captured one or more visuals;
  determining, by the processor, one or more parameters related to a movement of the movable object in the predefined area based on detecting the pose of the one or more markers; where such parameters are 2D location, speed and direction of the vehicle (204) and implementing the fusion of marker locations together from each camera within the network of cameras (202) to estimate the final vehicle location;
  implement a calibration technique to match frames from the cameras to the a 3-dimensional (3D) world;
  plot regions of interest on the 3D world onto a 2-dimensional (2D) layouts of the 3D world; and
    automatically detecting, by the processor, one or more driving violations committed by the movable object based on the determined one or more parameters;
  implemented by one or more processors coupled to the memory and operable to execute the one or more routines to:
  wherein the one or more processors are further configured to:
synchronize frames from the cameras (202) such that all frames from the one or more cameras (202) are of the same time stamp to generate the most accurate pose and position of the objects or vehicles;
  synchronize frames from the cameras (202) using multi-threading, wherein a synchronizer thread and a processing thread are initiated on the launch of the program and separate capture threads are launched that start capturing the frames at their respective speed;
  enable the synchronizer thread to estimate a slowest camera (202) based on a first frame received from the slowest camera (202), wherein the first frame forms an index key; and send the index key to the processing thread, which starts querying frames for the remaining cameras (202).

15. A method of claim 14, for determining the position and pose of a vehicle (204) in a parking lot, driving yard (200) or another location with markings on the road.

16. The method of claim 15, wherein the violations are sent to a series of specialists or workers to validate the results of the system.

17. The method of claim 16, wherein addition of the number of cameras can increase the area of coverage of the network and also the accuracy of the pose and position estimation.

18. The system of claim 1, wherein the violations are sent to a series of specialists or workers to validate the results of the system.

* * * * *